(12) United States Patent
Sekiyama et al.

(10) Patent No.: US 6,801,370 B2
(45) Date of Patent: Oct. 5, 2004

(54) IMAGING OPTICAL SYSTEM

(75) Inventors: Kentaro Sekiyama, Hachioji (JP); Mitsujiro Konno, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/253,892

(22) Filed: Sep. 25, 2002

(65) Prior Publication Data
US 2003/0107823 A1 Jun. 12, 2003

(30) Foreign Application Priority Data

Sep. 27, 2001 (JP) ........................................ 2001-296879

(51) Int. Cl.[7] ........................ G02B 17/00; G02B 26/00; G02B 5/08
(52) U.S. Cl. ........................ 359/726; 359/291; 359/846; 359/847
(58) Field of Search ................................ 359/290, 291, 359/726, 754, 846, 847

(56) References Cited

U.S. PATENT DOCUMENTS 4,128,390 A * 12/1978 Yoshino et al. ............. 431/242
5,610,707 A * 3/1997 Duncan et al. ............. 356/121

FOREIGN PATENT DOCUMENTS

| JP | 11-317894 | 11/1999 |
| JP | 2000-298237 | 10/2000 |

OTHER PUBLICATIONS

Rai–Choudhury, "Handbook of Microlithography, Micromachining and Microfabrication, vol. 2: Micromachining and Microfabrication," Pie Press ©1997 pp. 484–497.

Vdovin, G., "Quick Focusing of Imagining Optics Using Micromachined Adaptive Mirrors," Optics Communication, vol. 140, Aug. 1, 1997, pp. 187–190.

* cited by examiner

Primary Examiner—David N. Spector
(74) Attorney, Agent, or Firm—Pillsbury Winthrop LLP

(57) ABSTRACT

An imaging optical system includes, in order from the object side, a negative lens, a first deformable mirror, an aperture stop, a positive lens unit, and a second deformable mirror. When a horizontal half angle of view of a ray of light incident on the optical system is represented by $\omega$, the first and second deformable mirrors satisfying a condition, $50° < 2\omega < 175°$, are used to perform focusing. Whereby, the imaging optical system which allows focusing to be performed, irrespective of its small diameter and size, can be provided.

16 Claims, 42 Drawing Sheets

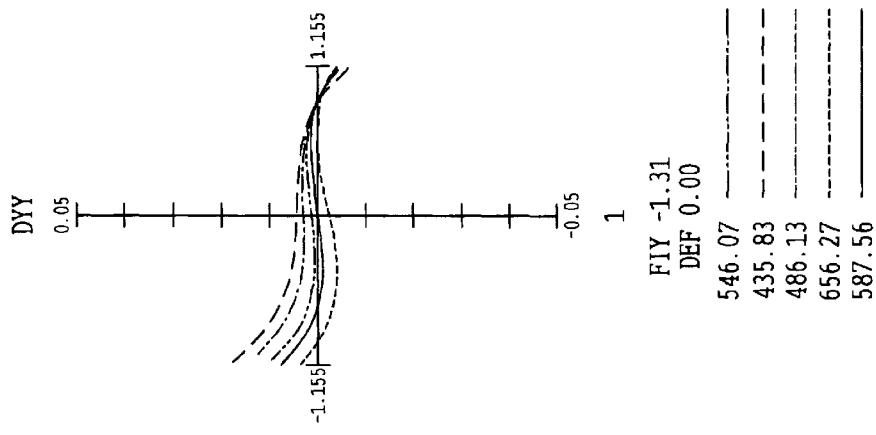
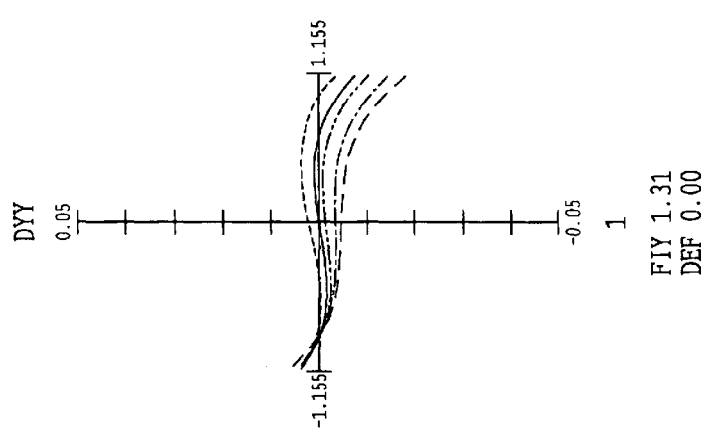
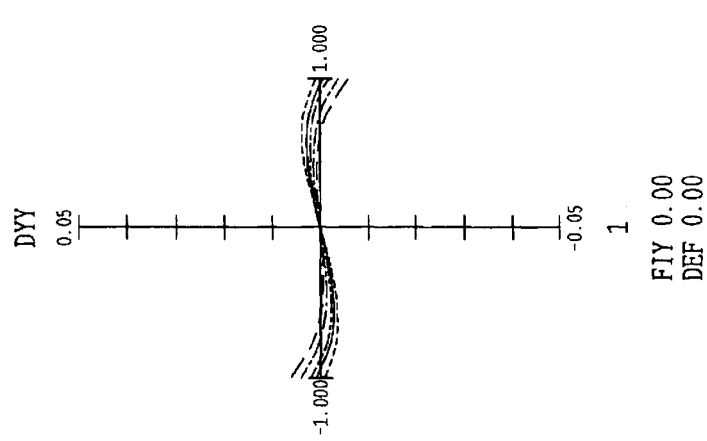

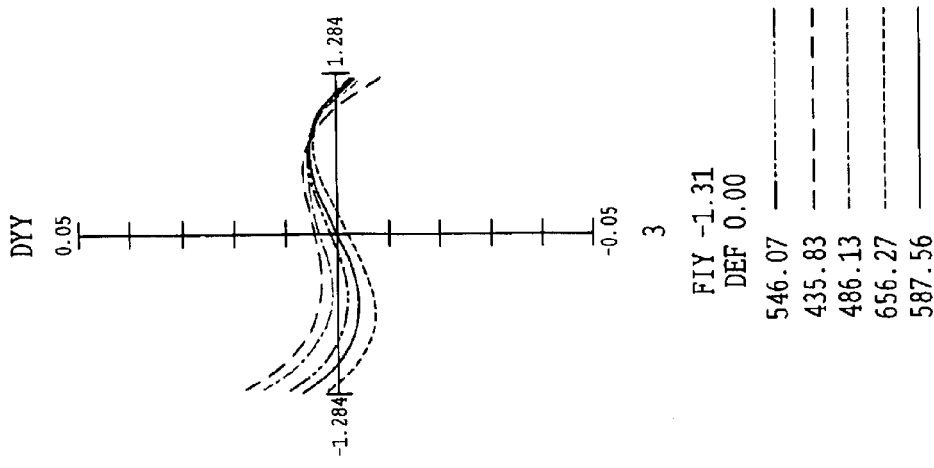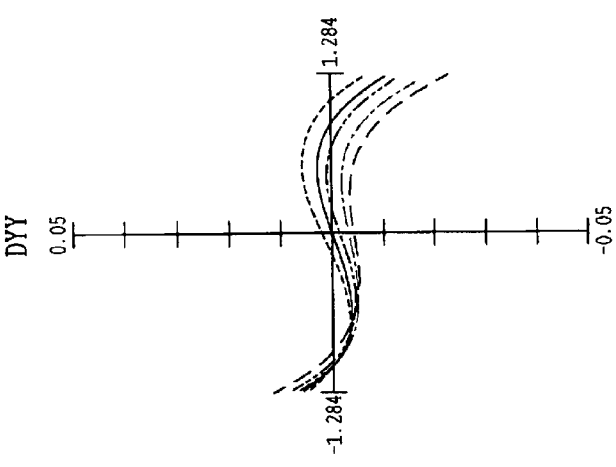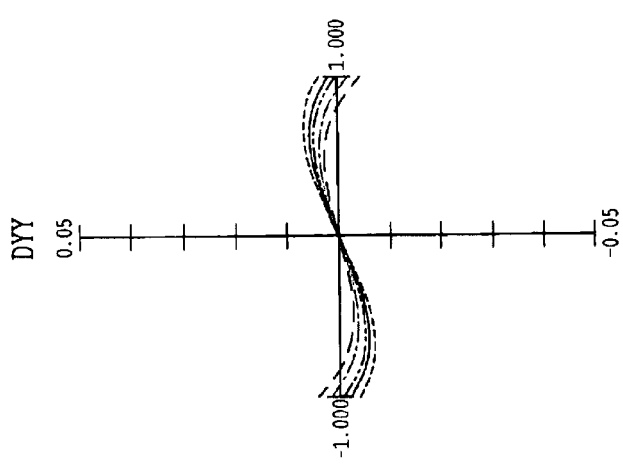

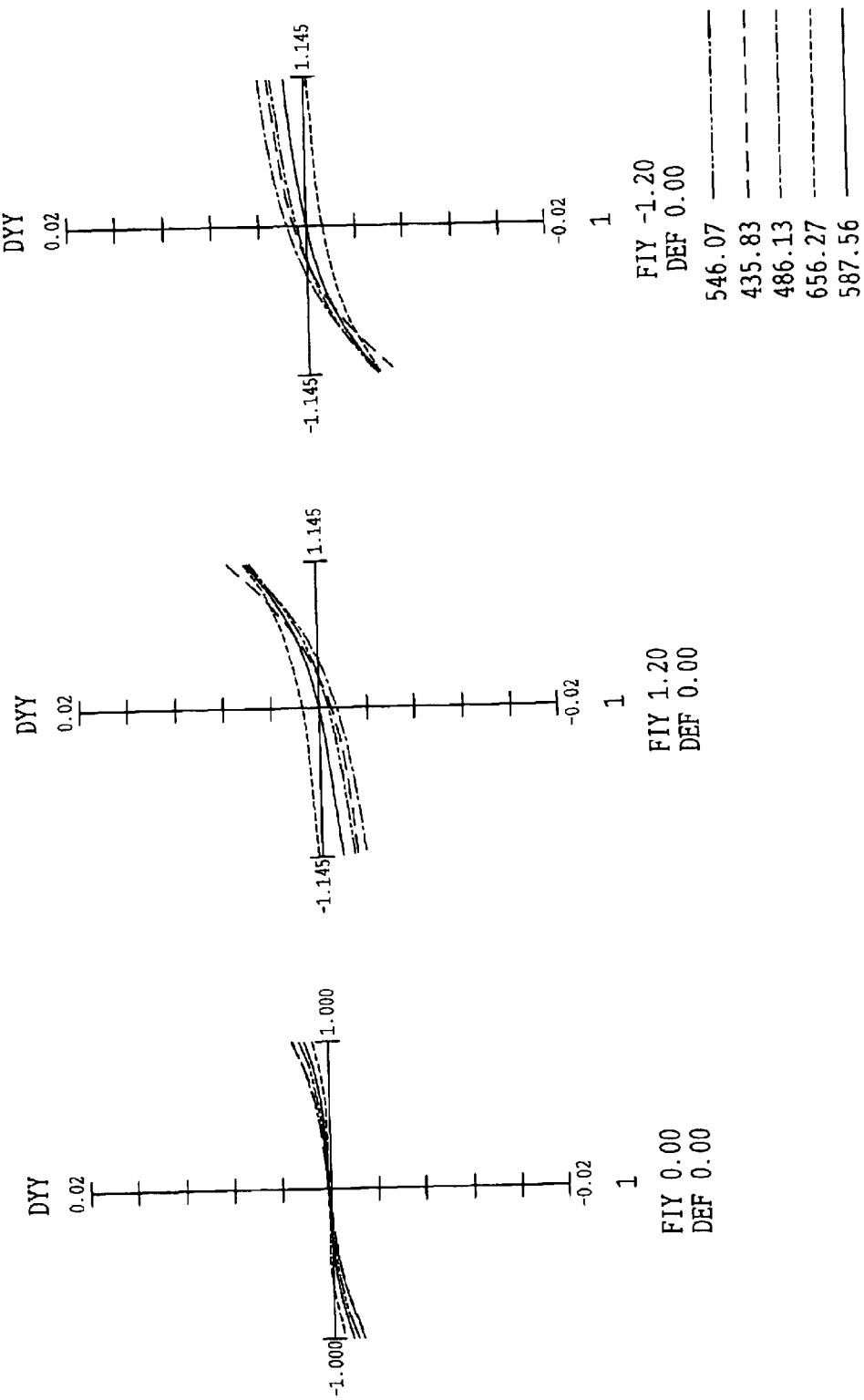

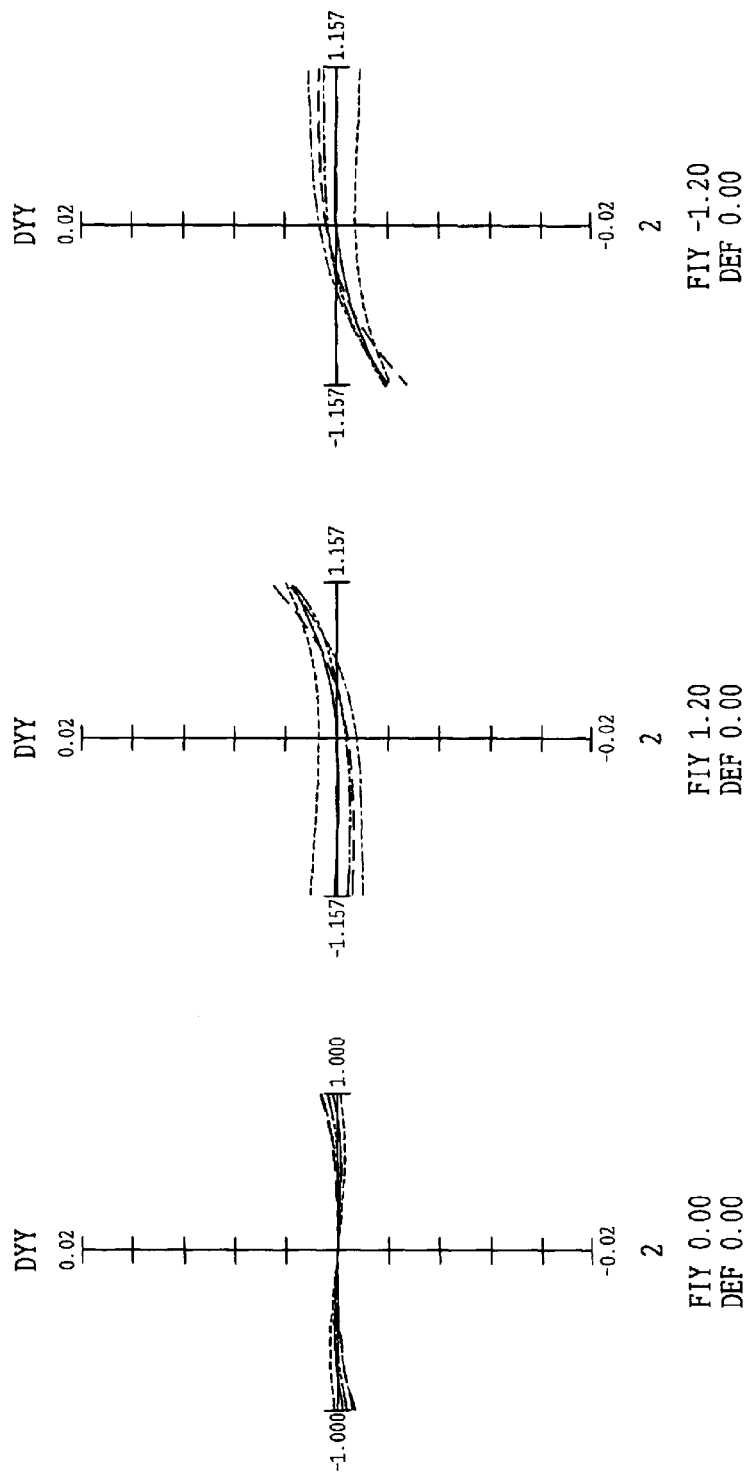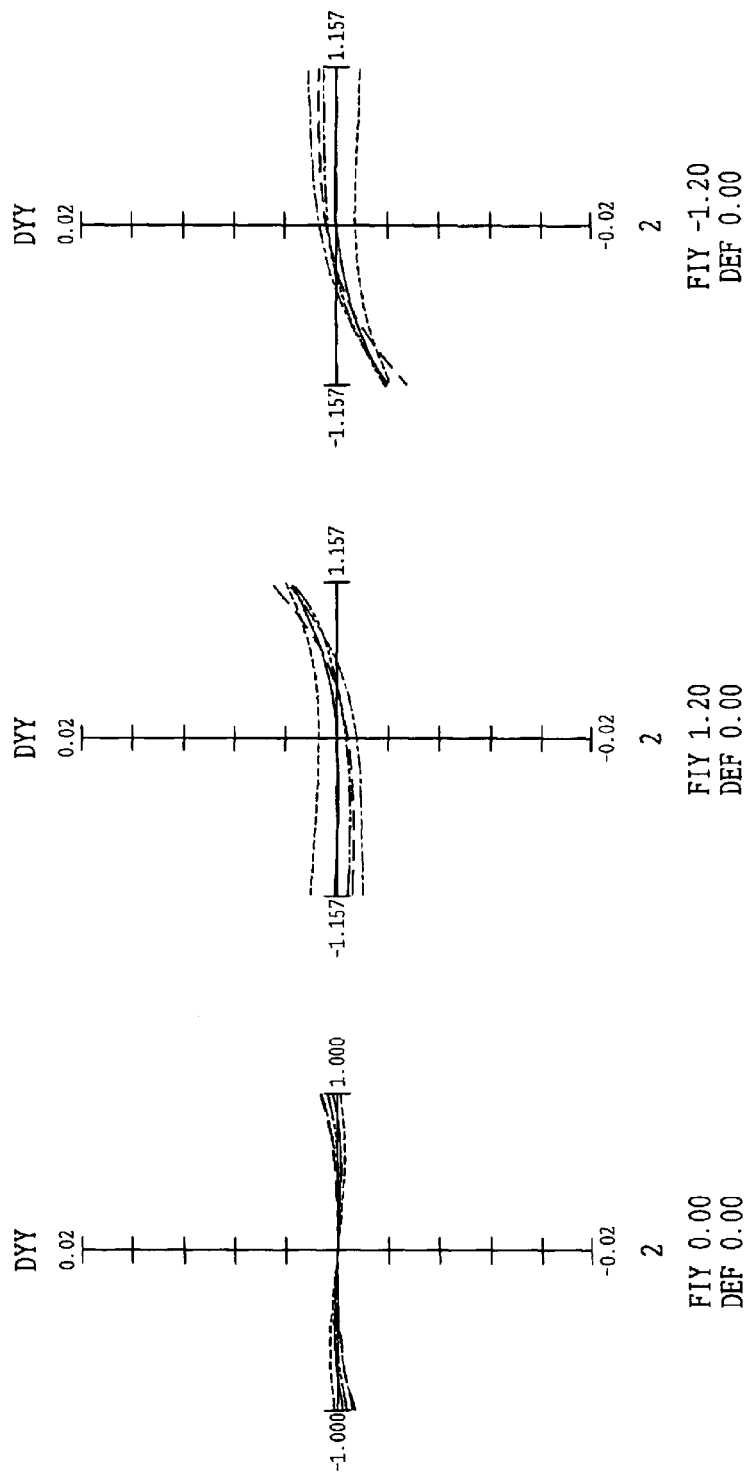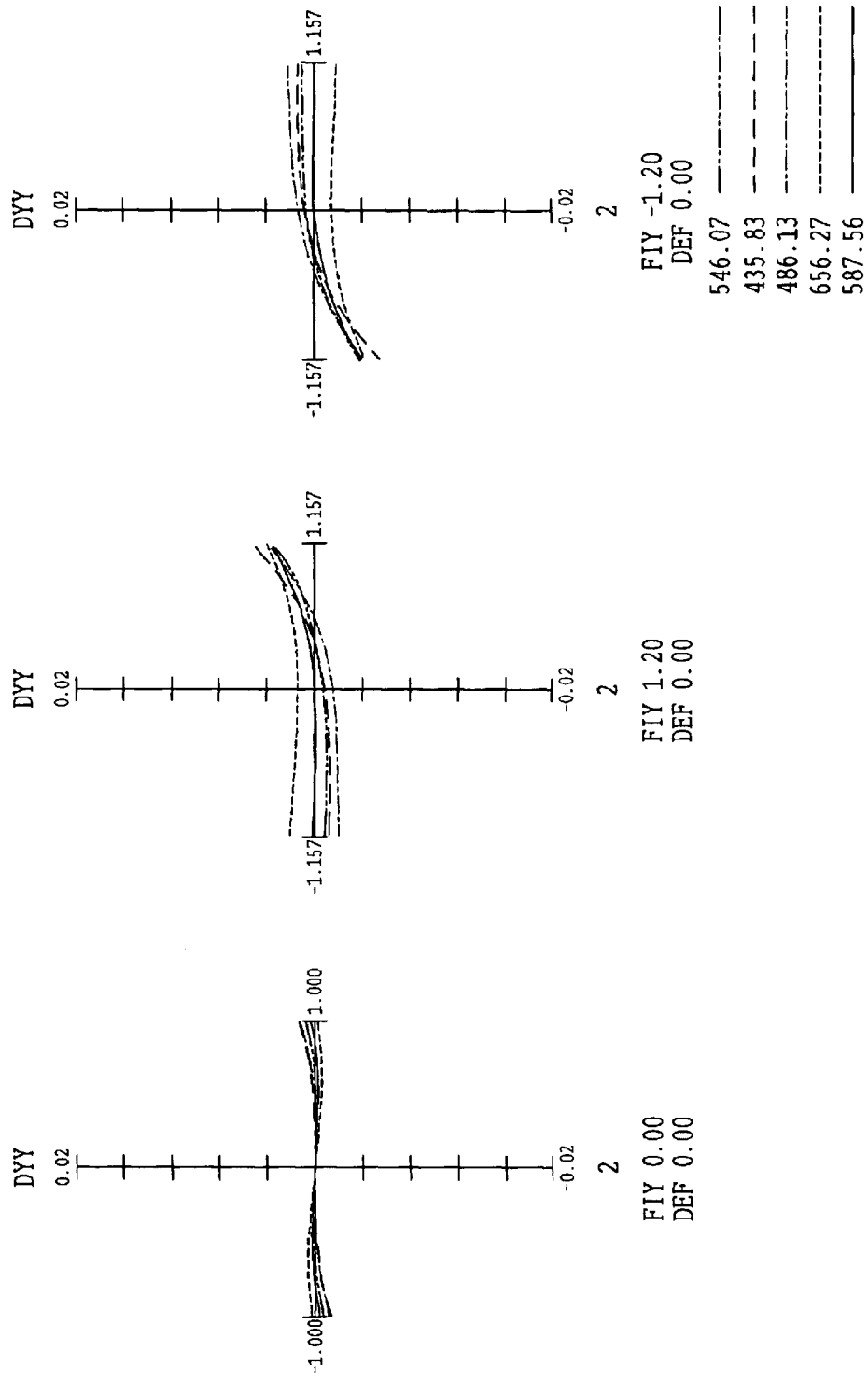

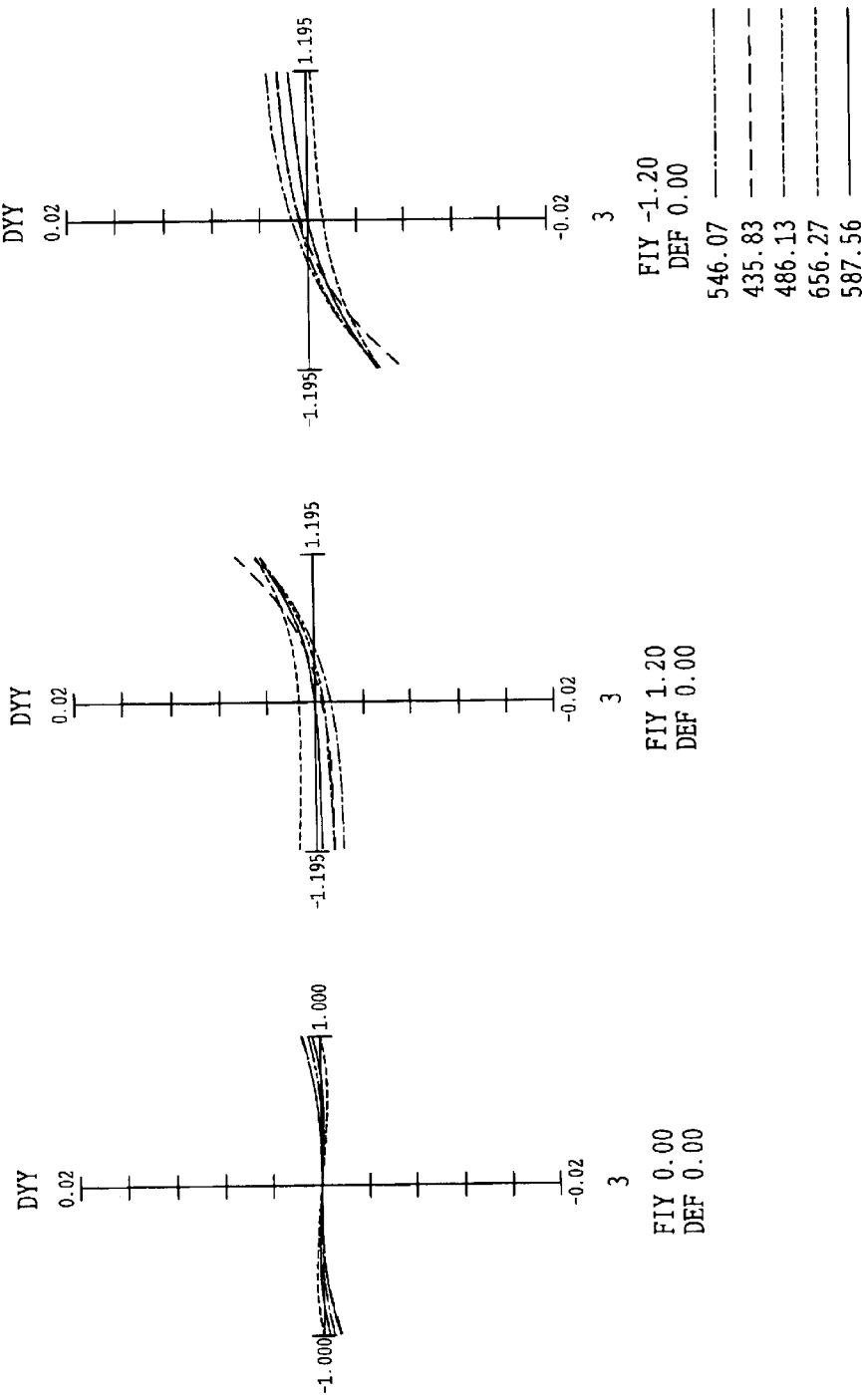

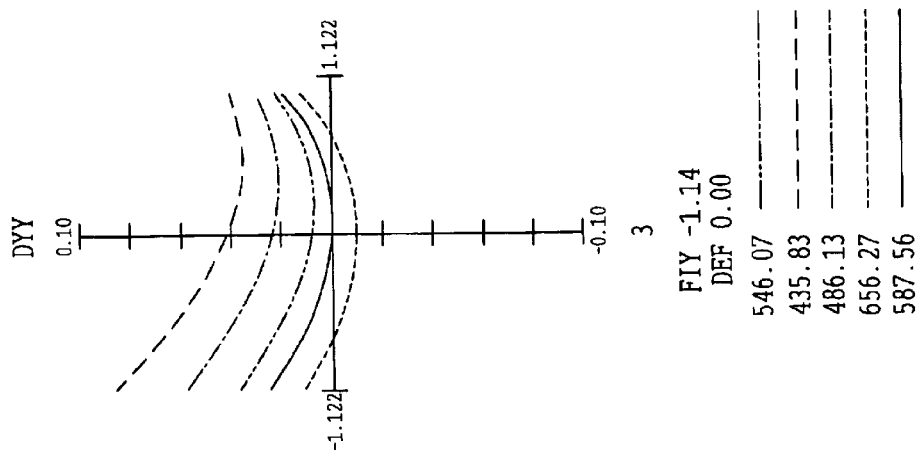
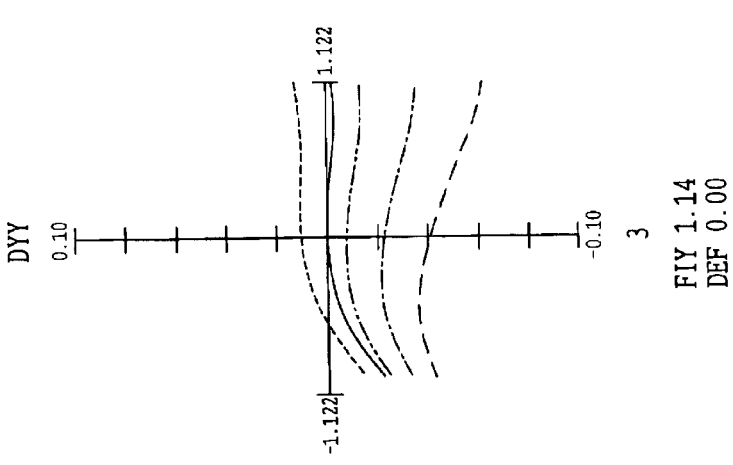
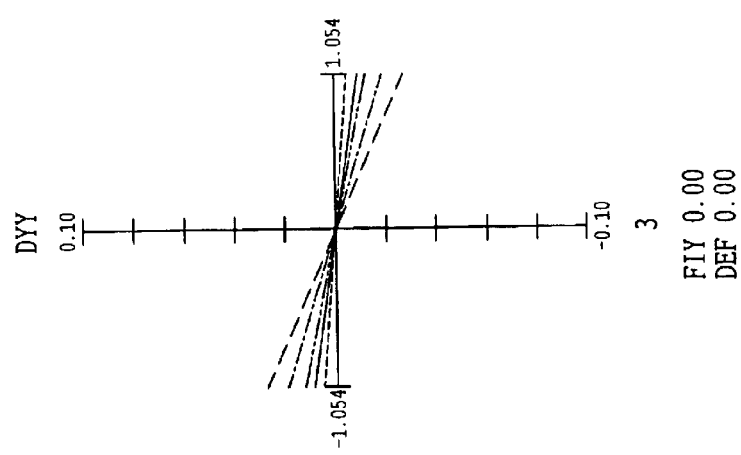

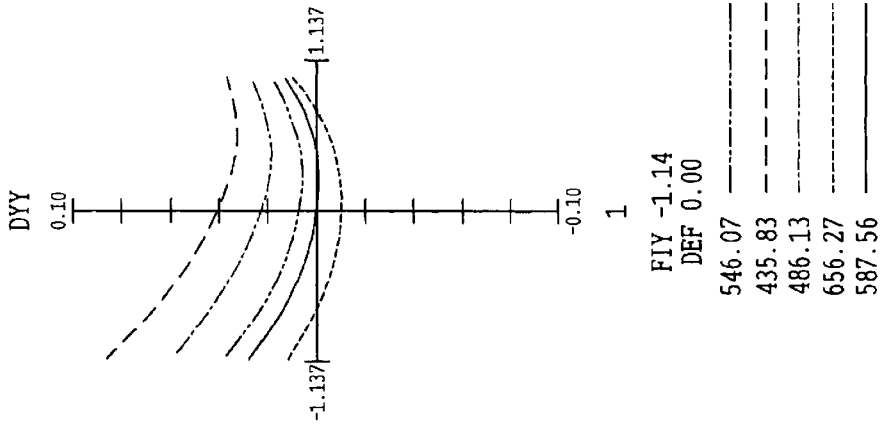
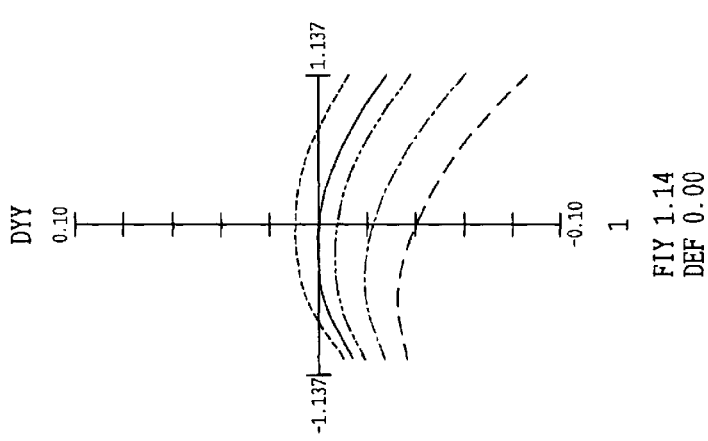
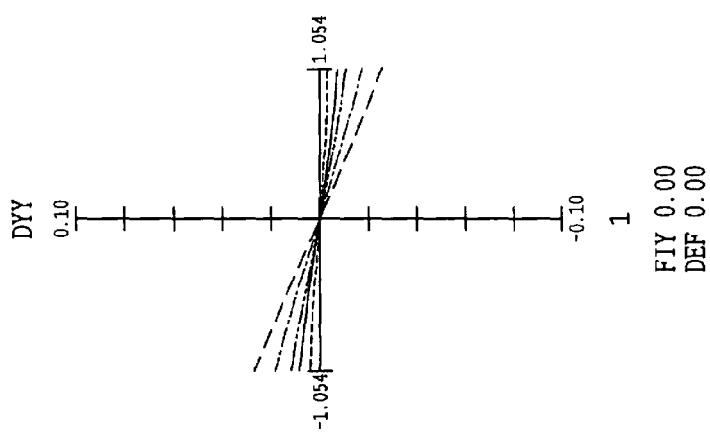

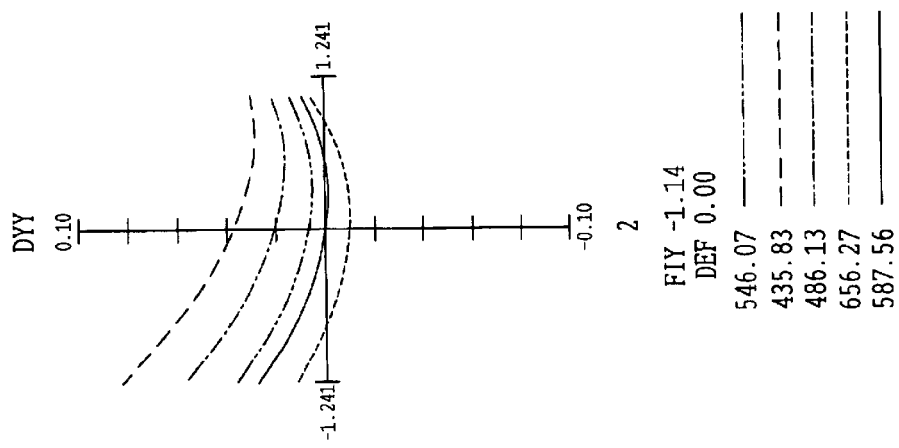
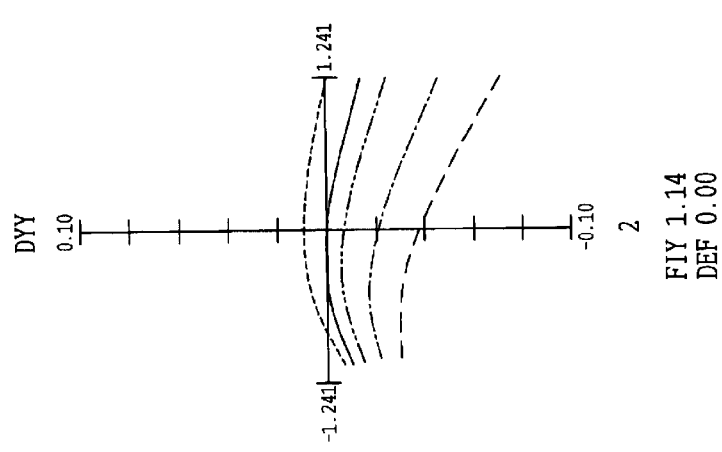
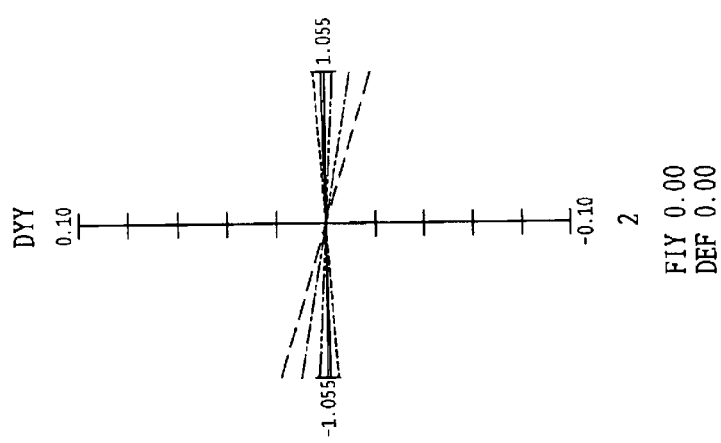

TRANS-TYPE                    CIS-TYPE

IMAGING OPTICAL SYSTEM

BACKGROUND OF THE INVENTION

1. Field of the Invention

The present invention relates to a variable optical-property element such as a variable focal-length lens, a variable focal-length diffraction optical element, a variable deflection-angle prism, or a variable focal-length mirror, and to an imaging optical system used in an optical apparatus, such as spectacles, a video projector, a digital camera, a TV camera, an endoscope, a telescope, or a camera finder, having an optical system including the variable optical-property element.

2. Description of Related Art

Conventional lenses have been manufactured by polishing glass. The focal length cannot be varied by the lens itself, and thus the mechanical structure of an optical system becomes complicated, for example, because a lens unit must be moved along the optical axis for focusing or zooming of a camera, or for a change of the magnification of the optical system.

Since a motor or the like is used for moving a part of the lens unit, this conventional practice has disadvantages that power consumption is large, noise is produced, response time is long, and much time is required for moving lenses.

For shake prevention as well, mechanical movement of the lenses by a motor or a solenoid causes defects such as a large power consumption and a complicate mechanical structure, resulting in a high cost.

An endoscope is one of optical apparatuses provided with imaging optical systems. Since the endoscope is used in such a way that it is inserted into a human body, a finer imaging optical system is required. Thus, it is very difficult to incorporate a focusing mechanism in the endoscope, and most of the optical systems of conventional endoscopes have constant focal lengths.

SUMMARY OF THE INVENTION

It is, therefore, a primary object of the present invention to provide an imaging optical system which is capable of performing focusing, irrespective of its small diameter and size, in an optical system of an endoscope, a monitoring camera, or a digital camera.

It is another object of the present invention to provide an imaging optical system which can be utilized for a robot's eye, a cellular phone with an imaging function, a doorscope camera, a vehicle mounted camera, etc.

In order to achieve the above objects, the imaging optical system according to the present invention uses a deformable mirror, and is configured to perform focusing upon satisfying a condition, $50°<2\omega<175°$, where $\omega$ is a horizontal half angle of view.

The imaging optical system according to the present invention uses a plurality of deformable mirrors to perform focusing.

The imaging optical system according to the present invention is constructed so that when focusing is performed, at least one deformable mirror has the shape of a free-formed surface in a certain state.

These and other objects as well as the feature and advantages of the present invention will become apparent from the following detailed description of the preferred embodiments when taken in conjunction with the accompanying drawings.

BRIEF DESCRIPTION OF THE DRAWINGS

FIG. 3A is a diagram showing transverse aberration in the Y direction of a chief ray that the angle of view in the X direction is zero and the angle of view in the Y direction is zero, in a wavelength band at a far point in the first embodiment;

FIG. 3B is a diagram showing transverse aberration in the Y direction of a chief ray that the angle of view in the X direction is zero and the angle of view in a positive Y direction is maximum, in the wavelength band at the far point in the first embodiment;

FIG. 3C is a diagram showing transverse aberration in the Y direction of a chief ray that the angle of view in the X direction is zero and the angle of view in a negative Y direction is maximum, in the wavelength band at the far point in the first embodiment;

FIG. 5A is a diagram showing transverse aberration in the Y direction of a chief ray that the angle of view in the X direction is zero and the angle of view in the Y direction is zero, in a wavelength band at a near point of the imaging optical system in the first embodiment;

FIG. 5B is a diagram showing transverse aberration in the Y direction of a chief ray that the angle of view in the X direction is zero and the angle of view in the positive Y direction is maximum, in the wavelength band at the near point of the imaging optical system in the first embodiment;

FIG. 5C is a diagram showing transverse aberration in the Y direction of a chief ray that the angle of view in the X direction is zero and the angle of view in the negative Y direction is maximum, in the wavelength band at the near point of the imaging optical system in the first embodiment;

FIG. 7A is a diagram showing transverse aberration in the Y direction of a chief ray that the angle of view in the X direction is zero and the angle of view in the Y direction is zero, in the wavelength band at the far point in the second embodiment;

FIG. 7B is a diagram showing transverse aberration in the Y direction of a chief ray that the angle of view in the X direction is zero and the angle of view in the positive Y direction is maximum, in the wavelength band at the far point in the second embodiment;

FIG. 7C is a diagram showing transverse aberration in the Y direction of a chief ray that the angle of view in the X direction is zero and the angle of view in the negative Y direction is maximum, in the wavelength band at the far point in the second embodiment;

FIG. 8A is a diagram showing transverse aberration in the Y direction of a chief ray that the angle of view in the X direction is zero and the angle of view in the Y direction is zero, in the wavelength band at the standard distance in the second embodiment;

FIG. 8B is a diagram showing transverse aberration in the Y direction of a chief ray that the angle of view in the X direction is zero and the angle of view in the positive Y direction is maximum, in the wavelength band at the standard distance in the second embodiment;

FIG. 8C is a diagram showing transverse aberration in the Y direction of a chief ray that the angle of view in the X direction is zero and the angle of view in the negative Y direction is maximum, in the wavelength band at the standard distance in the second embodiment;

FIG. 9A is a diagram showing transverse aberration in the Y direction of a chief ray that the angle of view in the X direction is zero and the angle of view in the Y direction is zero, in the wavelength band at the near point in the second embodiment;

FIG. 9B is a diagram showing transverse aberration in the Y direction of a chief ray that the angle of view in the X direction is zero and the angle of view in the positive Y direction is maximum, in the wavelength band at the near point in the second embodiment;

FIG. 9C is a diagram showing transverse aberration in the Y direction of a chief ray that the angle of view in the X direction is zero and the angle of view in the negative Y direction is maximum, in the wavelength band at the near point in the second embodiment;

FIG. 11A is a diagram showing transverse aberration in the Y direction of a chief ray that the angle of view in the X direction is zero and the angle of view in the Y direction is zero, in a wavelength band at a far point in the third embodiment; FIG. 11B is a diagram showing transverse aberration in the Y direction of a chief ray that the angle of view in the X direction is zero and the angle of view in the positive Y direction is maximum, in the wavelength band at the far point in the third embodiment;

FIG. 11C is a diagram showing transverse aberration in the Y direction of a chief ray that the angle of view in the X direction is zero and the angle of view in the negative Y direction is maximum, in the wavelength band at the far point in the third embodiment;

FIG. 12A is a diagram showing transverse aberration in the Y direction of a chief ray that the angle of view in the X direction is zero and the angle of view in the Y direction is zero, in the wavelength band at the standard distance in the third embodiment;

FIG. 12B is a diagram showing transverse aberration in the Y direction of a chief ray that the angle of view in the X direction is zero and the angle of view in the positive Y direction is maximum, in the wavelength band at the standard distance in the third embodiment;

FIG. 12C is a diagram showing transverse aberration in the Y direction of a chief ray that the angle of view in the X direction is zero and the angle of view in the negative Y direction is maximum, in the wavelength band at the standard distance in the third embodiment;

FIG. 13A is a diagram showing transverse aberration in the Y direction of a chief ray that the angle of view in the X direction is zero and the angle of view in the Y direction is zero, in the wavelength band at the near point in the third embodiment;

FIG. 13B is a diagram showing transverse aberration in the Y direction of a chief ray that the angle of view in the X direction is zero and the angle of view in the positive Y direction is maximum, in the wavelength band at the near point in the third embodiment;

FIG. 13C is a diagram showing transverse aberration in the Y direction of a chief ray that the angle of view in the X direction is zero and the angle of view in the negative Y direction is maximum, in the wavelength band at the near point in the third embodiment;

DETAILED DESCRIPTION OF THE PREFERRED EMBODIMENTS

Figure 1:
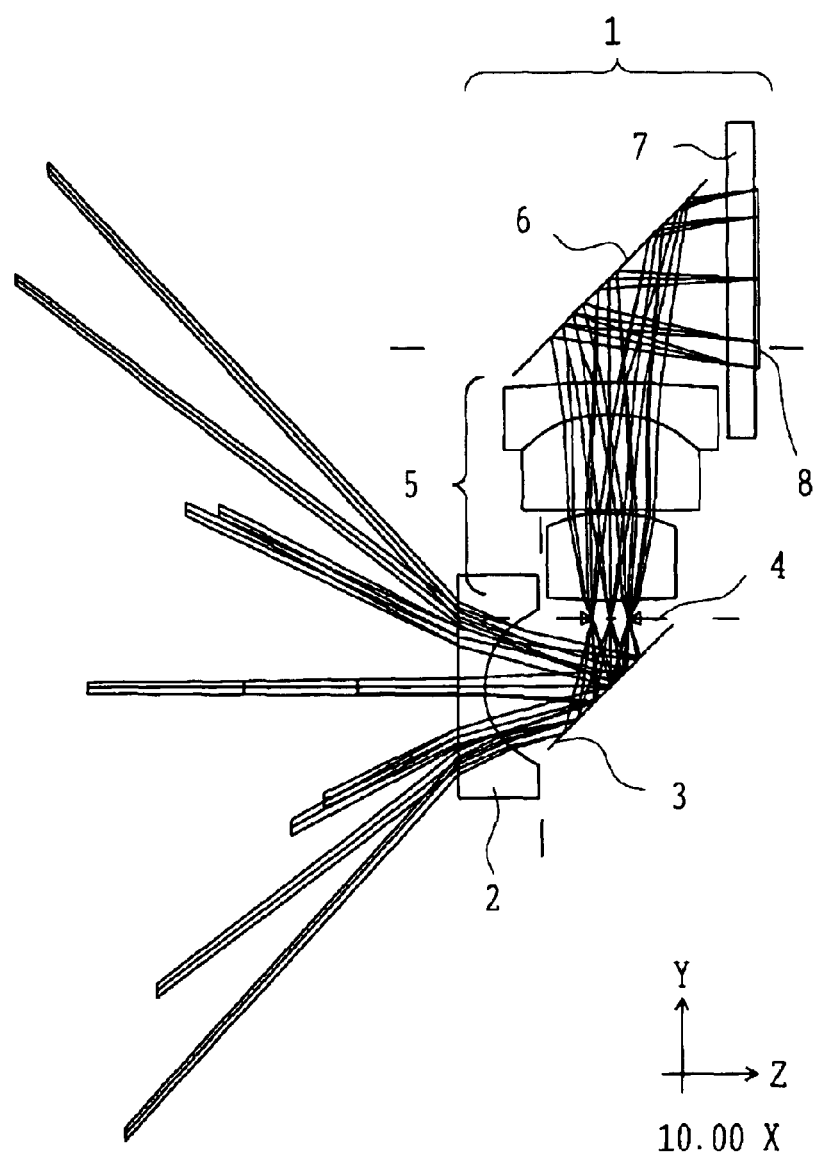
FIG. 1 is a sectional view showing an arrangement, developed along the optical axis, in a first embodiment of the imaging optical system according to the present invention.

A variable optical-property mirror used in the imaging optical system of the present invention is such that its surface profile, for example, as in the deformable mirror, is arbitrarily changed to a convex surface, a planar surface, or a concave surface, and thereby an optical power or an optical property, such as aberration, can be changed at will. Thus, even when the object distance of the imaging system is altered, focusing can be achieved only by changing the profile of the mirror surface. In this case, the profile of the mirror surface may be a rotationally symmetrical curve, but in order to much improve correction for aberration, it is desirable that the mirror surface is a rotationally asymmetrical free-formed surface.

The free-formed surface used in the present invention is defined by the following equation. The Z axis in this defining equation constitutes an axis of the free-formed surface.

$$Z = cr^2 / \left[ 1 + \sqrt{\{1 - (1+k)c^2 r^2\}} \right] + \sum_{j=2}^{N} C_j X^m Y^n \qquad (1)$$

Here, the first term of this equation is a spherical surface term, and the second term is a free-formed surface term.

In the spherical surface term, c: curvature of the vertex,
k: a conic constant,
r=$\sqrt{(X^2+Y^2)}$
N: a natural number of 2 or larger The free-formed surface term is as follows:

$$\sum_{j=2}^{N} C_j X^m Y^n = C_2 X + C_3 Y + C_4 X^2 + C_5 XY + C_6 Y^2 + C_7 X^3 +$$

$$C_8 X^2 Y + C_9 XY^2 + C_{10} Y^3 + C_{11} X^4 + C_{12} X^3 Y + C_{13} X^2 Y^2 +$$

$$C_{14} XY^3 + C_{15} Y^4 + C_{16} X^5 + C_{17} X^4 Y + C_{18} X^3 Y^2 + C_{19} X^2 Y^3 +$$

$$C_{20} XY^4 + C_{21} Y^5 + C_{22} X^6 + C_{23} X^5 Y + C_{24} X^4 Y^2 + C_{25} X^3 Y^3 +$$

$$C_{26} X^2 Y^4 + C_{27} XY^5 + C_{28} Y^6 + C_{29} X^7 + C_{30} X^6 Y + C_{31} X^5 Y^2 +$$

$$C_{32} X^4 Y^3 + C_{33} X^3 Y^4 + C_{34} X^2 Y^5 + C_{35} XY^6 + C_{36} Y^7 \ldots$$

where, $C_j$ (j is an integer of 2 or larger) is a coefficient.

The above-mentioned free-formed surface never generally has a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

As another defining equation of the free-formed surface which is a surface of a rotationally asymmetrical curved shape, it is possible to define the same by a Zernike polynomial. The profile of this surface is defined by means of the following equation (2). The Z axis of this defining equation (2) constitutes the axis of the Zernike polynomial. The rotationally asymmetrical surface is defined by means of polar coordinates of the axial height of Z relative to the X-Y plane. In the following description, A represents the distance from the Z axis within the X-Y plane and R represents the azimuth around the Z axis, expressed by the rotational angle as measured from the Z axis.

$$x = R \times \cos(A)$$

$$y = R \times \sin(A)$$

$$Z = D_2$$

$$+ D_3 R \cos(A) + D_4 R \sin(A)$$

$$+ D_5 R^2 \cos(2A) + D_6(R^2-1) + D_7 R^2 \sin(2A)$$

$$+ D_8 R^3 \cos(3A) + D_9(3R^3-2R)\cos(A) + D_{10}(3R^3-2R)\sin(A) + D_{11} R^3 \sin(3A)$$

$$+ D_{12} R^4 \cos(4A) + D_{13}(4R^4-3R^2)\cos(2A) + D_{14}(6R^4-6R^2+1)$$

$$+ D_{15}(4R^4-3R^2)\sin(2A) + D_{16} R^4 \sin(4A)$$

$$+ D_{17} R^5 \cos(5A) + D_{18}(5R^5-4R^3)\cos(3A) + D_{19}(10R^5-12R^3+3R)\cos(A)$$

$$+ D_{20}(10R^5-12R^3+3R)\sin(A) + D_{21}(5R^5-4R^3)\sin(3A) + D_{22} R^5 \sin(5A)$$

$$+ D_{23} R^6 \cos(6A) + D_{24}(6R^6-5R^4)\cos(4A) + D_{25}(15R^6-20R^4+6R^2)\cos(2A)$$

$$+ D_{26}(20R^6-30R^4+12R^2-1) + D_{27}(15R^6-20R^4+6R^2)\sin(2A)$$

$$+ D_{28}(6R^6-5R^4)\sin(4A) + D_{29} R^6 \sin(6A) \qquad (2)$$

where $D_m$ (m is an integer of 2 or larger) is a coefficient. In order to design an optical system symmetrical about the direction of the X axis, it is only necessary to use $D_4$, $D_5$, $D_6$, $D_{10}$, $D_{11}$, $D_{12}$, $D_{13}$, $D_{14}$, $D_{20}$, $D_{21}$, $D_{22}$ . . . .

Each of the above defining equations has been shown as an example of a rotationally asymmetrical curved surface. It is needless to mention that the same effect is obtained for any other defining equation. So far as mathematically the same value is obtained, the curved surface profile may be expressed by any other definition.

In the present invention, by bringing all odd-number order terms of X in Equation (1) to 0, the free-formed surface having the symmetrical surface parallel to the Y-Z plane is obtained.

When the imaging optical system of the present invention is designed to satisfy any of the following conditions, the imaging optical system of small size and high performance in which focusing is possible is obtained, which is favorable.

When the focal length of an optical element unit with negative power of the optical system is represented by f_n and the focal length of the entire lens system is represented by f_tot, it is desirable to satisfy the following condition:

$$0.01 < |f\_n|/f\_tot < 100 \qquad (3)$$

When the focal length of the optical element unit with negative power is so chosen as to satisfy Condition (3), the angle of view of the imaging optical system can be widened.

If the value of |f_n|/ f_tot is below the lower limit of Condition (3), the Petzval sum becomes extremely minus and correction for curvature of field becomes considerably difficult.

On the other hand, if the value of |f_n|/f_tot exceeds the upper limit, a distance from the last optical surface to a solid-state image sensor cannot be increased. Hence, it becomes difficult to place the variable mirror in the optical system or to widen the angle of view of the imaging optical system.

When the optical system is designed to satisfy the following condition:

$$0.1 < |f\_n|/f\_tot < 10 \qquad (4)$$

correction for aberration is facilitated together with that of an optical element unit with positive power, which is more favorable.

It is further desirable to satisfy the following condition:

$$0.1 < |f\_n|/f\_tot < 3 \qquad (5)$$

When the focal length of the optical element unit with positive power is denoted by f_p, it is desirable to satisfy the following condition:

$$0.01 < |f\_p|/f\_tot < 100 \qquad (6)$$

When the focal length of the optical element unit with positive power is so chosen as to satisfy Condition (6), a space for placing the variable optical-property mirror is maintained and the overall length of the lens system can be reduced.

When the optical system is designed to further satisfy the following condition:

$$0.1 < |f\_p|/f\_tot < 10 \qquad (7)$$

correction for aberration is facilitated, which is more favorable.

It is further favorable to satisfy the following condition:

$$0.1 < |f\_p|/f\_tot < 3 \qquad (8)$$

When a distance from the last optical surface of the optical system to an imaging plane is represented by Sk and the focal length of the entire lens system is represented again by f_tot, it is desirable to satisfy the following condition:

$$0.01 < Sk/f\_tot < 100 \qquad (9)$$

Here, the last optical surface of the optical system refers to the last optical surface of the optical element unit with positive power of the optical system, except for an infrared cutoff filter and a low-pass filter.

When the distance from the last optical surface to the imaging plane is so chosen as to satisfy Condition (9), aberration can be corrected in a proper limit without extremely increasing the overall length of the lens system.

It is more favorable to further satisfy the following condition:

$$0.1 < Sk/f\_tot < 10 \qquad (10)$$

It is further favorable to satisfy the following condition:

$$0.5 < Sk/f\_tot < 8 \qquad (11)$$

When the horizontal half angle of view of a ray of light incident on the optical system is denoted by ω, it is desirable to satisfy the following condition:

$$50° < 2ω < 175° \qquad (12)$$

When the angle of view of the incident ray is so chosen as to satisfy Condition (12), an optical system suitable for an optical product requiring a wide angle of view is obtained.

Further, it is favorable for correction for aberration to satisfy the following condition:

$$75° < 2ω < 170° \qquad (13)$$

Still further, it is more favorable for correction for aberration to satisfy the following condition:

$$85° < 2ω < 160° \qquad (14)$$

The coefficients $C_4$ and $C_6$ of the free-formed surface of Equation (1) expressing the shape of the variable mirror may have different signs.

When the coefficients $C_4$ and $C_6$ are set as mentioned above, aberration in a tangential direction and aberration in a sagittal direction are properly suppressed and the amount of deformation of the mirror surface can be decreased.

The coefficients $C_4$ of the free-formed surface may be set to have different signs in two states of different object distances.

When the coefficients $C_4$ are set in this way, the amount of deformation of the mirror surface where the object distance is changed can be reduced, compared with the case of the coefficients $C_4$ of identical signs in the two different states.

Similarly, the coefficients $C_6$ of the free-formed surface may be set to have different signs in two states of different object distances.

In one variable optical-property mirror in the optical system, it is desirable that the convergent function of the mirror is increased at the near point of the object distance and is impaired at the far point of the object distance.

It is desirable that the coefficients $C_8$ and $C_{10}$ of the free-formed surface of Equation (1) expressing the shape of the variable optical-property mirror satisfy the following condition, at least, in a certain state:

$$0.01 < C_{10}/C_8 < 100 \tag{15}$$

When the optical system satisfies Condition (15), the shift of an image plane from the image position of the optical system can be suppressed in a proper limit without extremely increasing the amount of deformation of the mirror.

When the optical system is designed to satisfy the following condition, at least, in a certain state:

$$0.1 < C_{10}/C_8 < 10 \tag{16}$$

the balance with other aberration can be held, which is more favorable.

It is desirable that the coefficients $C_{11}$ and $C_{13}$ of the free-formed surface of Equation (1) expressing the shape of the variable optical-property mirror satisfy the following condition, at least, in a certain state:

$$0.01 < C_{13}/C_{11} < 100 \tag{17}$$

When the optical system satisfies Condition (17), aberration of a formed image relative to an object position outside the tangential plane of the optical system can be suppressed in a proper limit without extremely increasing the amount of deformation of the mirror.

When the optical system is designed to satisfy the following condition, at least, in a certain state:

$$0.1 < C_{13}/C_{11} < 10 \tag{18}$$

the mirror surface can be deformed without difficulty, which is more favorable.

It is desirable that the coefficients $C_{11}$ and $C_{15}$ of the free-formed surface of Equation (1) expressing the shape of the variable optical-property mirror satisfy the following condition, at least, in a certain state:

$$0.01 < C_{15}/C_{11} < 100 \tag{19}$$

When the optical system satisfies Condition (19), high-order aberration relative to curvature of field around the visual field can be corrected without extremely increasing the amount of deformation of the mirror surface.

When the optical system is designed to satisfy the following condition, at least, in a certain state:

$$0.1 < C_{15}/C_{11} < 10 \tag{20}$$

the balance of aberration with the center portion of the visual field can be held, which is more favorable.

It is favorable that at least one variable optical-property mirror is designed to satisfy the following condition:

$$0 < md/f\_tot < 1 \tag{21}$$

where md is the maximum amount of deformation of the mirror surface of the mirror and again f_tot is the focal length of the entire lens system.

When the maximum amount of deformation of the mirror surface of the mirror is so chosen as to satisfy Condition (21), aberration of the optical system can be corrected in a proper limit without extremely increasing the amount of deformation of the mirror surface, which is desirable.

When the optical system, instead of satisfying Condition (21), satisfies the following condition:

$$0.00003 < md/f\_tot < 0.1 \tag{21B}$$

the control of the mirror is facilitated, which is favorable.

When at least one of the coefficients $C_8$, $C_{10}$, and $C_{17}$ is set to be not zero in at least one state, the shape of the mirror surface of the variable optical-property mirror becomes asymmetrical with respect to the Y direction, and aberration changed in accordance with the position of an object point in the Y-Z plane can be corrected.

The embodiments of the present invention will be described below with reference to the drawings.

First Embodiment

FIG. 1 shows the structure of the first embodiment of the imaging optical system according to the present invention.

An imaging optical system 1 of the first embodiment includes, in order from the object side, a concave lens 2 which is a first lens; a deformable mirror 3; an aperture stop 4; an optical element unit 5 with positive power, comprised of a plurality of lenses; a deformable mirror 6; an infrared cutoff filter (or a low-pass filter) 7; and a solid-state image sensor, which constitute the imaging system of a side-view type endoscope using two deformable mirrors. Also, in FIG. 1, reference numeral 8 represents the imaging surface of the solid-state image sensor. In the present invention, the imaging surface is assumed to be circular, but it may be rectangular or square, or may have a polygonal shape such as an octagon.

In the imaging optical system 1 of the first embodiment, a ray of light from an object, passing through the concave lens 2 which is the first lens of an endoscope imaging system objective lens is reflected by the deformable mirror 3 and travels through the aperture stop 4. The ray then passes through the optical element unit 5 with positive power, and after being reflected again by the deformable mirror 6 and passing through the infrared cutoff filter (or the low-pass filter) 7, reaches the imaging surface 8 of the solid-state image sensor.

In the imaging optical system 1 of the first embodiment, the focal length is 2.073 mm, the F-number is 8.294, a diagonal image height is 2.622 mm, and a horizontal angle of view is 96.1°.

The imaging optical system 1 of the first embodiment is such that the profile of the mirror surface of each of the deformable mirrors 3 and 6 is changed, and thereby focusing can be performed with respect to the object distance extending from 20 mm at the far point (a position 1), through 16 mm at the standard point (a position 2), to 12.5 mm at the near point (a position 3).

The imaging optical system 1 of the first embodiment, which uses two deformable mirrors in the optical system, has the merit that the amount of deformation of each mirror surface can be reduced in comparison with the case where focusing is carried out by a single deformable mirror.

The imaging optical system 1 shown in FIG. 1 is constructed so that the optical axis of the ray of light from the object is nearly parallel with that of the ray incident on the solid-state image sensor (namely, within the limit of a shift of ±5°). However, as shown in FIG. 2, the imaging optical system 1 may, of course, be constructed so that individual optical axes cross or twist.

Figure 2:
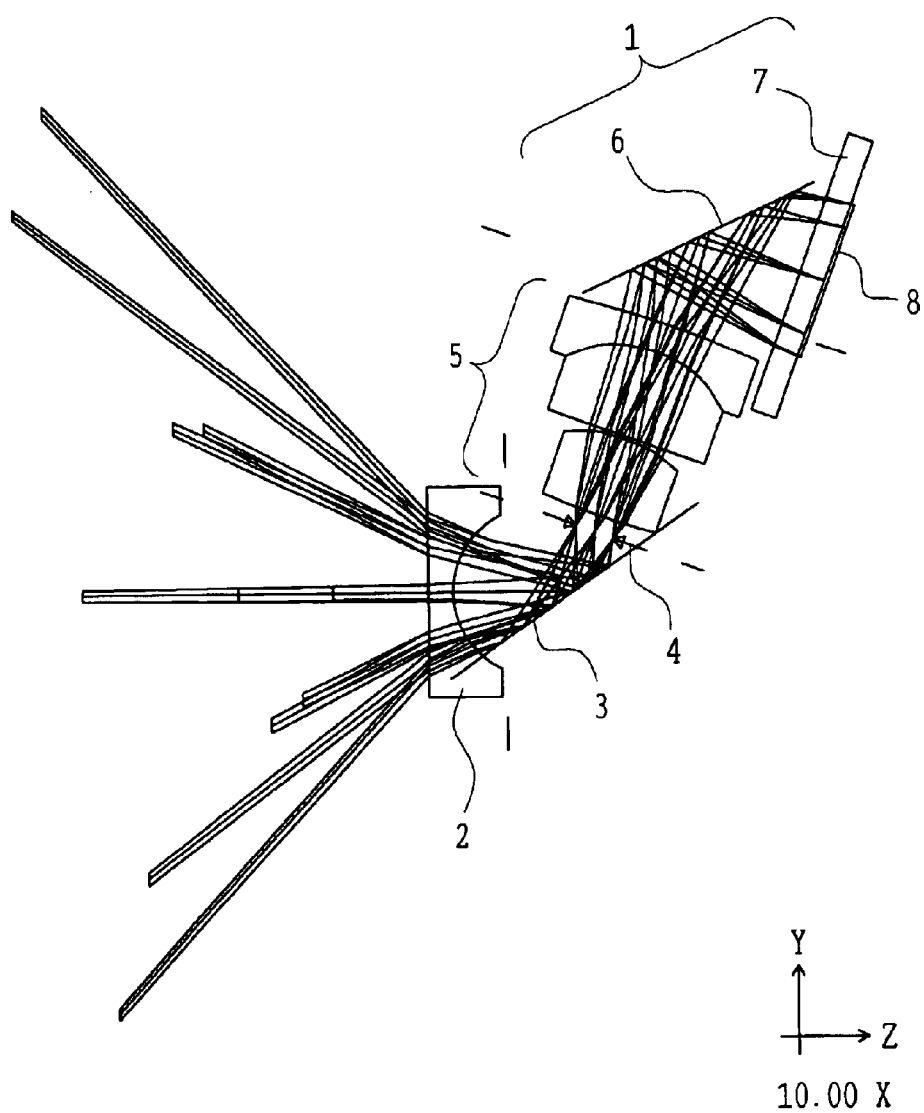
FIG. 2 is a sectional view showing an arrangement, developed along the optical axis, in a modified example of the first embodiment.

In the optical system of FIG. 2, an angle made by the object surface with the imaging surface is 20°. Lens data other than this are the same as in FIG. 1. When the angle made by the object surface with the imaging surface is 5–48°, an oblique-view type endoscope is satisfactory. It is preferably 5–28°.

The concave lens 2 may be constructed with an optical element unit of negative power comprised of a plurality of lenses.

The imaging optical system 1 is designed as a retrofocus system. A space for the deformable mirror 6 can thus be ensured, and the angle of view is large, which is suitable for an endoscope optical system.

Subsequently, numerical data of the imaging optical system of the first embodiment are provided. In the numerical data, "DM" refers to a deformed deformable mirror. For the profile of the mirror surface, "WE", "ST", and "TE" represent the near point, the standard point, and the far point, respectively. "So" represents the object distance.

In the present invention, the Z axis of the coordinate system in the object surface is defined by a straight line passing through the center of the object and perpendicular to the object surface. A direction perpendicular to the Z axis is taken as the Y axis, and an axis constituting a right-handed coordinate system, together with the Y axis and the Z axis, is taken as the X axis.

The optical axis is defined by the path of a ray of light passing through the centers of the object surface and the stop or the exit pupil. Therefore, the optical axis is in general changed in accordance with the deformation of the deformable mirror, but this change is often slight. Thus, in the present invention, the Z axis practically coincides with the optical axis.

A decentering surface is given by the amount of decentering (the directions of the X axis, the Y axis, and the Z axis are taken as X, Y, and Z, respectively) at the vertex of the reference plane of the optical system from its center and angles of inclination ($\alpha$, $\beta$, and $\gamma$(°)), with the center axis of the plane (the Z axis of Equation (1) in the case of the free-formed surface) as a center. In this case, the positive of each of the angles $\alpha$, $\beta$, and $\gamma$ means a counterclockwise direction with respect to the positive direction of the axis.

For the decentering, after decentering in the X, Y, and Z directions, the coordinate system is rotated in order of the angles $\alpha$, $\beta$, and $\gamma$.

The decentering is of two types: decentering of a local coordinate system and decentering of a defining coordinate system. The local coordinate system refers to the coordinate system of the surface of an input face number, while the defining coordinate system refers to the coordinate system of each surface subsequent to the input face number, excluding the input face number. For example, in a mirror, the coordinates of the reflecting surface are defined by the local coordinate system, and the coordinates of each surface subsequent thereto are defined by the defining coordinate system. A space between the mirror surface and the next surface is along the Z axis of the defining coordinate system.

Even when only the tilt of the mirror surface is shown, the angle of inclination of the center axis of the surface is given as the amount of decentering.

The term relative to the free-formed surface or the aspherical surface whose data are not described is zero. The refractive index is described in terms of the d line (wavelength 587.56 nm). All lengths are expressed in millimeters.

The focal length of the optical system in the present invention is defined as the focal length where the surface of the deformable mirror is plane.

The above description of the numerical data holds for the case of each embodiment of the present invention.

Figure 4C:
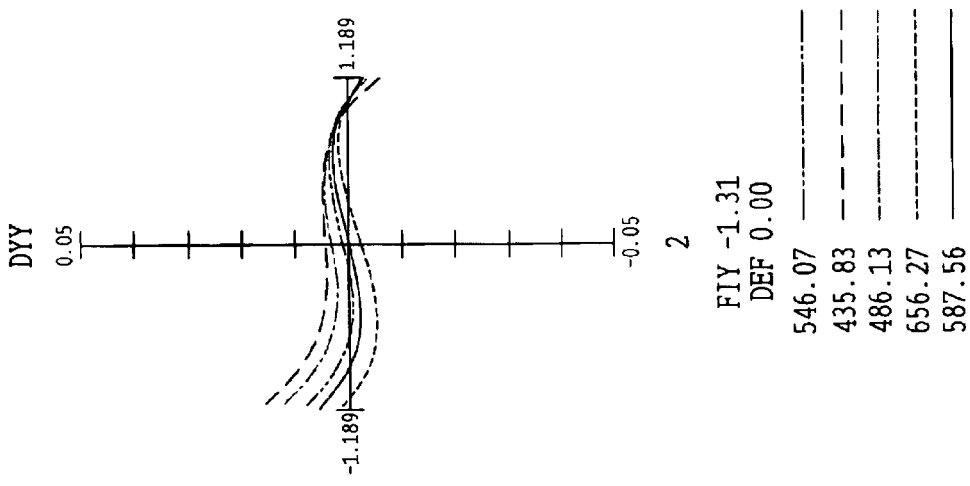
FIG. 4C is a diagram showing transverse aberration in the Y direction of a chief ray that the angle of view in the X direction is zero and the angle of view in the negative Y direction is maximum, in the wavelength band at the standard distance in the first embodiment.
Figure 4B:
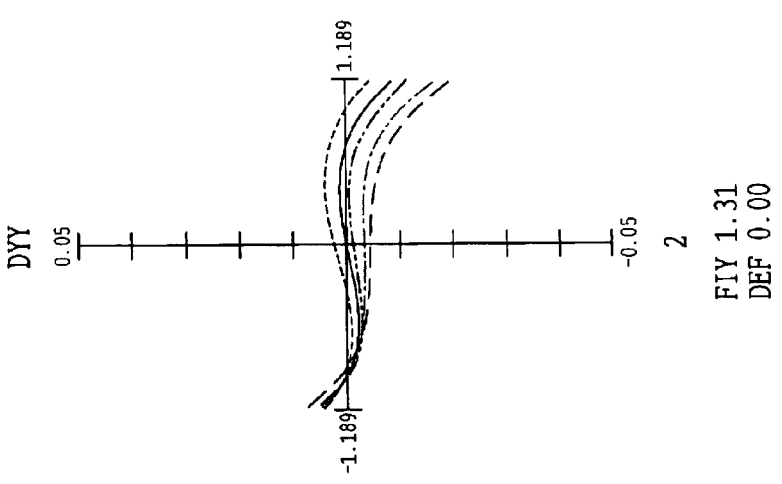
FIG. 4B is a diagram showing transverse aberration in the Y direction of a chief ray that the angle of view in the X direction is zero and the angle of view in the positive Y direction is maximum, in the wavelength band at the standard distance in the first embodiment.
Figure 4A:
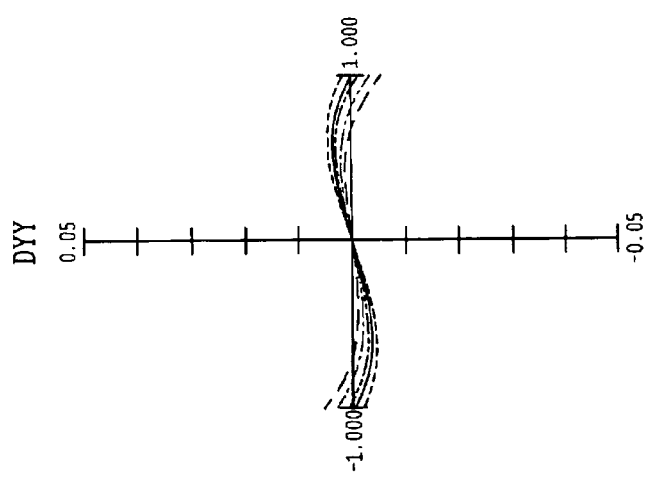
FIG. 4A is a diagram showing transverse aberration in the Y direction of a chief ray that the angle of view in the X direction is zero and the angle of view in the Y direction is zero, in a wavelength band at a standard distance in the first embodiment.

Transverse aberrations in the wavelength band at the far point, the standard point, and the near point of the imaging optical system of the first embodiment are shown in FIGS. 3A–3C, 4A–4C, and 5A–5C, respectively. FIGS. 3A, 4A, and 5A show transverse aberrations relating to the Y direction of a chief ray that the angle of view in the X direction is zero and the angle of view in the Y direction is zero. FIGS. 3B, 4B, and 5B show transverse aberrations relating to the Y direction of a chief ray that the angle of view in the X direction is zero and the angle of view in the positive Y direction is maximum. FIGS. 3C, 4C, and 5C show transverse aberrations relating to the Y direction of a chief ray that the angle of view in the X direction is zero and the angle of view in the negative Y direction is maximum. The description of the above aberration diagrams holds for the case of each embodiment of the present invention.

Numerical data 1

| Face No. | Radius of curvature | Face interval | Decentering | Refractive index | Abbe's number |
|---|---|---|---|---|---|
| Object surface | ∞ | So | | | |
| 1 | ∞ | 0.3937 | | 1.51633 | 64.14 |
| 2 | 1.3153 | 1.8828 | | | |
| 3 | DM [1] | 1.0000 | Decentering [1] | | |
| 4 (stop) | ∞ | 0.2920 | | | |
| 5 | 13.6792 | 1.2723 | | 1.88300 | 40.76 |
| 6 | −2.2509 | 0.0304 | | | |
| 7 | ∞ | 1.4092 | | 1.51633 | 64.14 |
| 8 | −1.8589 | 0.4670 | | 1.84666 | 23.78 |
| 9 | −14.9921 | 1.5000 | | | |
| 10 | ∞ | 1.0000 | | | |
| 11 | DM [2] | 1.7010 | Decentering [2] | | |
| 12 | ∞ | 0.4000 | | 1.52287 | 59.89 |
| 13 | ∞ | 0.0200 | | | |
| Image plane | ∞ | | | | |

-continued

So (object distance)

TE: 20 mm
ST: 16 mm
WE: 12.5 mm
DM [1]

TE: ∞ (plane surface)
ST: $C_4 = -3.9188 \times 10^{-4}$   $C_6 = -6.4980 \times 10^{-5}$   $C_8 = -1.8020 \times 10^{-4}$
$C_{10} = -7.8153 \times 10^{-5}$   $C_{11} = 8.8017 \times 10^{-4}$   $C_{13} = 4.8960 \times 10^{-4}$
$C_{15} = 3.6086 \times 10^{-5}$   $C_{17} = -2.7871 \times 10^{-4}$   $C_{19} = 1.6046 \times 10^{-4}$
$C_{21} = 1.4923 \times 10^{-5}$
WE: $C_4 = -1.0670 \times 10^{-3}$   $C_6 = 1.1925 \times 10^{-4}$   $C_8 = -4.7956 \times 10^{-4}$
$C_{10} = -6.0019 \times 10^{-5}$   $C_{11} = 7.2051 \times 10^{-4}$   $C_{13} = 5.1951 \times 10^{-4}$
$C_{15} = 7.5004 \times 10^{-5}$   $C_{17} = 4.4991 \times 10^{-4}$   $C_{19} = 1.50061 \times 10^{-4}$
$C_{21} = 1.0002 \times 10^{-6}$

DM [2]

TE: ∞ (plane surface)
ST: $C_4 = -1.3997 \times 10^{-3}$   $C_6 = 1.5964 \times 10^{-4}$   $C_8 = 6.7961 \times 10^{-4}$
$C_{10} = 3.0490 \times 10^{-4}$   $C_{11} = -2.8015 \times 10^{-4}$   $C_{13} = 8.2000 \times 10^{-4}$
$C_{15} = 7.0791 \times 10^{-5}$   $C_{17} = -7.4937 \times 10^{-5}$   $C_{19} = -9.5272 \times 10^{-5}$
$C_{21} = -6.0029 \times 10^{-6}$
WE: $C_4 = -1.3082 \times 10^{-3}$   $C_6 = -4.8475 \times 10^{-4}$   $C_8 = 5.5170 \times 10^{-4}$
$C_{10} = 4.4972 \times 10^{-4}$   $C_{11} = 1.4950 \times 10^{-4}$   $C_{13} = 9.8272 \times 10^{-4}$
$C_{15} = 1.8013 \times 10^{-4}$   $C_{17} = 2.9935 \times 10^{-5}$   $C_{19} = -9.5086 \times 10^{-4}$
$C_{21} = -1.1000 \times 10^{-5}$ Decentering [1]

Local coordinate system

X = 0.00   Y = 0.00   Z = 0.00
α = 45.00   β = 0.00   γ = 0.00

Defining coordinate system

X = 0.00   Y = 0.00   Z = 0.00
α = -90.00   β = 0.00   γ = 0.00

Decentering [2]

Local coordinate system

X = 0.00   Y = 0.00   Z = 0.00
α = -45.00   β = 0.00   γ = 0.00

Defining coordinate system

X = 0.00   Y = 0.00   Z = 0.00
α = 90.00   β = 0.00   γ = 0.00

Parameters of conditions f_tot (the focal length of the entire lens system) = 2.0728 mm
f_n (the focal length of the optical element unit with negative power) = -2.5474 mm
f_p (the focal length of the optical element unit with positive power) = 2.7025 mm
|f_n|/f_tot = 1.229
f_p/f_tot = 1.3038
IH (image height) = 1.311 mm
2ω (angle of view) = 96.1°
Sk (the distance from the last optical surface to the imaging plane) = 3.621 mm
Sk/f_tot = 1.74691
md (the maximum amount of deformation of the mirror surface)

|  | DM [1]: 0.18 μm | DM [2]: 0.68 μm |
|---|---|---|
| $C_{10}/C_8$ | DM [1]: 0.722 | DM [2]: 0.722 |
| $|C_{13}/C_{11}|$ | DM [1]: 1.352 | DM [2]: 1.353 |
| $|C_{15}/C_{11}|$ | DM [1]: 0.058 | DM [2]: 0.059 |
| md/f_tot | DM [1]: $8.68 \times 10^{-5}$ | DM [2]: $3.28 \times 10^{-4}$ |

Second Embodiment

Figure 6:
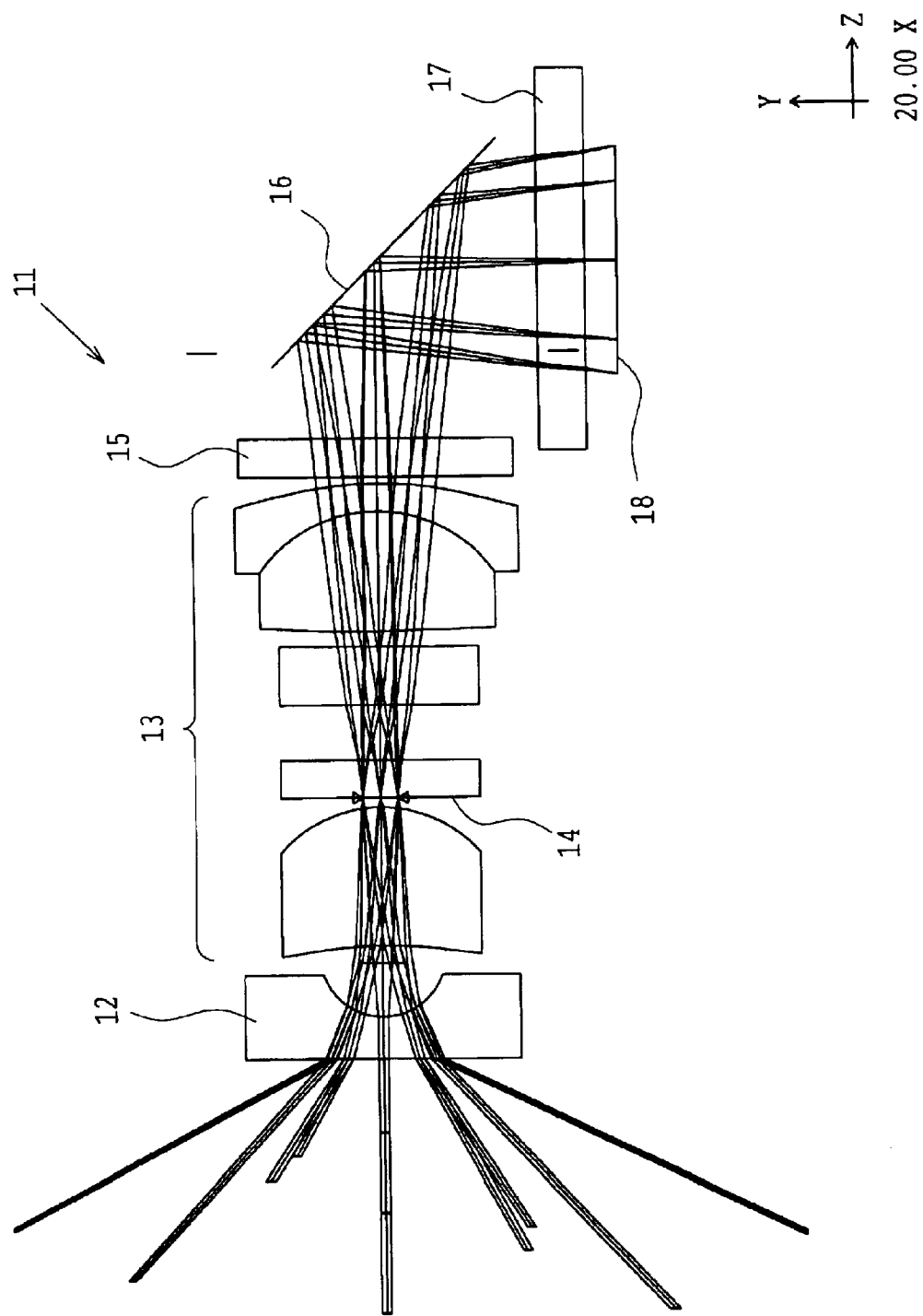
FIG. 6 is a sectional view showing an arrangement, developed along the optical axis, in a second embodiment of the imaging optical system according to the present invention.

FIG. 6 shows the structure of the second embodiment of the imaging optical system according to the present invention.

An imaging optical system 11 of the second embodiment includes, in order from the object side, a concave lens 12 which is a first lens; an optical element unit 13 with positive power, comprised of a plurality of lenses; an infrared cutoff filter 15; a deformable mirror 16; a low-pass filter 17; and a solid-state image sensor, which constitute an endoscope imaging system using a single deformable mirror. The optical element unit 13 with positive power has an aperture stop 14 in the plurality of lenses. Also, in FIG. 6, reference numeral 18 represents the imaging surface of the solid-state image sensor.

In the imaging optical system 11 of the second embodiment, a ray of light from the object, passing through the concave lens 12 which is a first lens of the endoscope imaging system objective lens is incident on the optical element unit 13 with positive power. The ray, after passing through the optical element unit 13 with positive power through the aperture stop 14 situated inside the optical element unit 13 with positive power, travels through the infrared cutoff filter 15 and is reflected by the deformable mirror 16. The ray then passes through the low-pass filter 17 and reaches the imaging surface 18 of the solid-state image sensor.

In the imaging optical system 11 of the second embodiment, the focal length is 1.643 mm, the F-number is 15.547, the diagonal image height is 2.392 mm, and the horizontal angle of view is 131.44°.

The imaging optical system 11 of the second embodiment is such that the surface of the deformable mirrors 16 is deformed, and thereby focusing can be performed with respect to the object distance extending from 12 mm at the far point (the position 1), through 10 mm at the standard point (the position 2), to 8 mm at the near point (the position 3).

The imaging optical system 11 shown in FIG. 6 is constructed so that the optical axis of a ray of light from an object is nearly perpendicular to that of the ray incident on the solid-state image sensor.

The imaging optical system 11 is designed as a retrofocus system. A space for the deformable mirror 16 can thus be ensured, and the angle of view is large, which is suitable for an endoscope optical system.

Subsequently, numerical data of the imaging optical system of the second embodiment are provided. Transverse aberrations in the wavelength band at the far point, the standard point, and the near point of the imaging optical system of the second embodiment are shown in FIGS. 7A–7C, 8A–8C, and 9A–9C, respectively.

Numerical data 2

| Face No. | Radius of curvature | Face interval | Decentering | Refractive index | Abbe's number |
|---|---|---|---|---|---|
| Object surface | ∞ | So | | | |
| 1 | ∞ | 0.4600 | | 1.88300 | 40.78 |
| 2 | 0.6420 | 0.7500 | | | |
| 3 | −5.6794 | 1.5000 | | 1.77250 | 49.60 |
| 4 | −1.3686 | 0.1000 | | | |
| 5 (stop) | ∞ | 0 | | | |
| 6 | ∞ | 0.4000 | | 1.52287 | 59.89 |
| 7 | ∞ | 0.6100 | | | |
| 8 | ∞ | 0.6200 | | 1.51400 | 75.00 |
| 9 | ∞ | 0.1600 | | | |
| 10 | 16.2257 | 1.3000 | | 1.69680 | 55.53 |
| 11 | −1.5000 | 0.2800 | | 1.84666 | 23.78 |
| 12 | −4.8481 | 0.1000 | | | |
| 13 | ∞ | 0.4000 | | 1.52287 | 59.89 |
| 14 | ∞ | 0.8400 | | | |
| 15 | DM [1] | 2.7265 | Decentering [1] | | |
| 16 | ∞ | 0.50000 | | 1.52287 | 59.89 |
| 17 | ∞ | 0.3170 | | | |
| Image plane | ∞ | | | | |

So (object distance)

TE: 12 mm
ST: 10 mm
WE: 8 mm
DM [1]

TE: ∞ (plane surface)
ST: $C_4 = -1.2381 \times 10^{-3}$    $C_6 = -2.0348 \times 10^{-5}$    $C_8 = 3.0988 \times 10^{-4}$
$C_{10} = 1.1004 \times 10^{-4}$    $C_{11} = 1.7972 \times 10^{-3}$    $C_{13} = 7.8328 \times 10^{-4}$
$C_{15} = 1.4013 \times 10^{-4}$    $C_{17} = -1.8034 \times 10^{-4}$    $C_{19} = -1.7992 \times 10^{-4}$
$C_{21} = -5.9821 \times 10^{-5}$
WE: $C_4 = 7.7065 \times 10^{-4}$    $C_6 = 3.1842 \times 10^{-3}$    $C_8 = 9.3999 \times 10^{-4}$
$C_{10} = 3.1041 \times 10^{-4}$    $C_{11} = 2.1970 \times 10^{-3}$    $C_{13} = 8.8400 \times 10^{-4}$
$C_{15} = 9.7118 \times 10^{-5}$    $C_{17} = -3.6064 \times 10^{-4}$    $C_{19} = -1.8013 \times 10^{-4}$
$C_{21} = -4.4861 \times 10^{-5}$ Decentering [1]

Local coordinate system

X = 0.00    Y = 0.007    Z = 0.007
α = −45.00    β = 0.00    γ = 0.00

Defining coordinate system

X = 0.00    Y = 0.00    Z = 0.00
α = 90.00    β = 0.00    γ = 0.00

-continued

Figure 10:
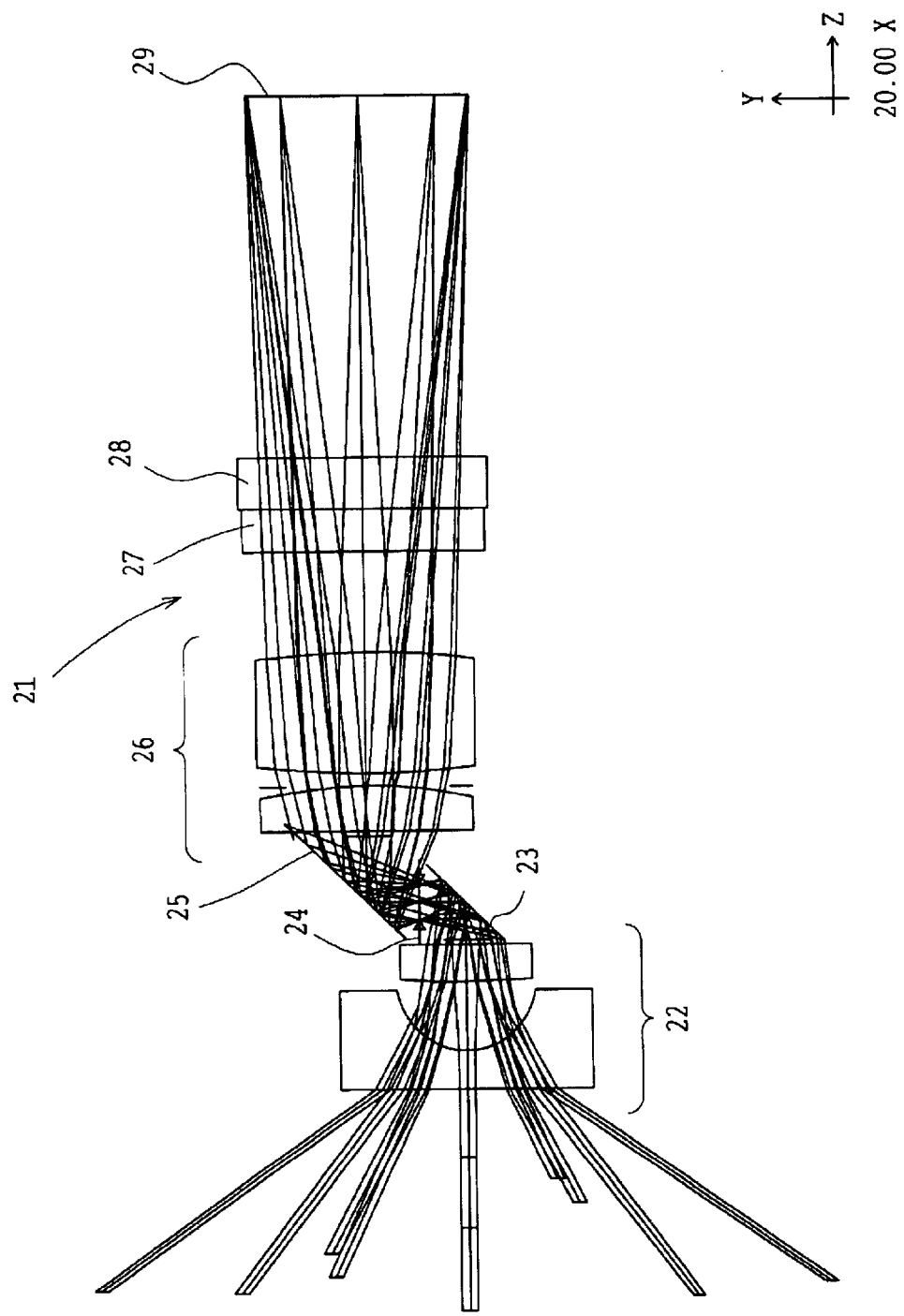
FIG. 10 is a sectional view showing an arrangement, developed along the optical axis, in a third embodiment of the imaging optical system of the present invention.

Parameters of conditions f_tot (the focal length of the entire lens system) = 1.6433 mm
f_n (the focal length of the optical element unit with negative power) = −0.7271 mm
f_p (the focal length of the optical element unit with positive power) = 2.0308 mm
|f_n|/f_tot = 0.4425
f_p/f_tot = 1.2358
IH (image height) = 1.196 mm
2ω (angle of view) = 131.44°
Sk (the distance from the last optical surface to the imaging plane) = 4.8835 mm
Sk/f_tot = 2.97176
md (the maximum amount of deformation of the mirror surface)  10.4 μm
$C_{10}/C_8$                                                   0.33
$|C_{13}/C_{11}|$                                              0.402
$|C_{15}/C_{11}|$                                              0.044
md/f_tot                                                       $6.33 \times 10^{-3}$ Third Embodiment FIG. 10 shows the structure of the third embodiment of the imaging optical system according to the present invention.

An imaging optical system 21 of the third embodiment includes an optical element unit 22 with negative power, having a first lens; a deformable mirror 23; an aperture stop 24; a deformable mirror 25; an optical element unit 26 with positive power, comprised of a plurality of lenses; an infrared cutoff filter 27; a low-pass filter 28; and a solid-state image sensor, which constitute an endoscope imaging system using two deformable mirrors. Also, in FIG. 10, reference numeral 29 represents the imaging surface of the solid-state image sensor.

In the imaging optical system 21 of the third embodiment, a ray of light from the object, passing through the optical element unit 22 with negative power of the endoscope imaging system objective lens is reflected by the deformable mirror 23 and passes through the aperture stop 24. After being reflected by the second deformable mirror 25 and passing through the optical element unit 26 with positive power, the ray travels through the infrared cutoff filter 27 and the low-pass filter 28 and reaches the imaging surface 29 of the solid-state image sensor.

In the imaging optical system 21 of the third embodiment, the focal length is 1.888 mm, the F-number is 10.213, the diagonal image height is 2.268 mm, and the horizontal angle of view is 110.96°.

The imaging optical system 21 of the third embodiment is such that the profile of the mirror surface of each of the deformable mirrors 23 and 25 is changed, and thereby focusing can be performed with respect to the object distance extending from 12 mm at the far point (the position 1), through 8 mm at the standard point (the position 2), to 2 mm at the near point (the position 3).

The imaging optical system 21 shown in FIG. 10 is constructed so that the optical axis of a ray of light from an object is nearly parallel with that of the ray incident on the solid-state image sensor (namely, within the limit of a shift of ±5°).

The two deformable mirrors 23 and 25 are arranged nearly parallel (within the limit of a shift of ±5°) and opposite to each other, having the aperture stop 24 between them.

Subsequently, numerical data of the imaging optical system of the third embodiment are provided. Transverse aberrations in the wavelength band at the far point, the standard point, and the near point of the imaging optical system of the third embodiment are shown in FIGS. 11A–11C, 12A–12C, and 13A–13C, respectively.

Numerical data 3

| Face No. | Radius of curvature | Face interval | Decentering | Refractive index | Abbe's number |
|---|---|---|---|---|---|
| Object surface | ∞ | So | | | |
| 1 | ∞ | 0.4092 | | 1.51633 | 64.14 |
| 2 | 0.7817 | 0.7444 | | | |
| 3 | 8.6070 | 0.4677 | | 1.88300 | 40.76 |
| 4 | ∞ | 0.4264 | | | |
| 5 | DM [1] | 0.5000 | Decentering [1] | | |
| 6 (stop) | ∞ | 0.5500 | | | |
| 7 | DM [2] | 0.7823 | Decentering [2] | | |
| 8 | ∞ | 0.5087 | | 1.88300 | 40.76 |
| 9 | −5.1200 | 0.1457 | | 1 | |
| 10 | 9.2630 | 1.3375 | | 1.88300 | 40.76 |
| 11 | −9.2841 | 1.1182 | | | |
| 12 | ∞ | 0.4766 | | 1.51633 | 64.14 |
| 13 | ∞ | 0.5693 | | 1.52287 | 59.89 |
| 14 | ∞ | 3.9128 | | | |
| Image plane | ∞ | | | | |

-continued

So (object distance)

TE: 12 mm
ST: 8 mm
WE: 2 mm
DM [1]

TE:  $C_4 = 6.0003 \times 10^{-4}$    $C_6 = 6.0081 \times 10^{-4}$    $C_8 = 1.2005 \times 10^{-3}$
     $C_{10} = 2.0054 \times 10^{-4}$  $C_{11} = -3.2172 \times 10^{-3}$  $C_{13} = -8.0318 \times 10^{-4}$
     $C_{15} = 6.9821 \times 10^{-4}$  $C_{17} = 3.0020 \times 10^{-4}$  $C_{19} = 2.0016 \times 10^{-4}$
     $C_{21} = -1.9996 \times 10^{-4}$
ST:  ∞ (plane surface)
WE:  $C_4 = -6.2994 \times 10^{-3}$   $C_6 = -3.0007 \times 10^{-3}$   $C_8 = -1.8006 \times 10^{-3}$
     $C_{10} = -1.2997 \times 10^{-3}$ $C_{11} = -1.7007 \times 10^{-3}$ $C_{13} = 2.2997 \times 10^{-3}$
     $C_{15} = 9.8977 \times 10^{-5}$  $C_{17} = -1.4973 \times 10^{-4}$ $C_{19} = -3.9821 \times 10^{-4}$
     $C_{21} = -9.9506 \times 10^{-5}$
DM [2]

TE:  $C_4 = 6.0007 \times 10^{-4}$    $C_6 = 6.0055 \times 10^{-4}$    $C_8 = 1.1996 \times 10^{-3}$
     $C_{10} = 1.9992 \times 10^{-4}$  $C_{11} = -3.1969 \times 10^{-3}$ $C_{13} = -7.9963 \times 10^{-4}$
     $C_{15} = 7.0035 \times 10^{-4}$  $C_{17} = 3.0006 \times 10^{-4}$  $C_{19} = 2.0000 \times 10^{-4}$
     $C_{21} = -1.9999 \times 10^{-4}$
ST:  ∞ (plane surface)
WE:  $C_4 = -6.3027 \times 10^{-3}$   $C_6 = -3.0008 \times 10^{-3}$   $C_8 = -1.7996 \times 10^{-3}$
     $C_{10} = -1.3001 \times 10^{-3}$ $C_{11} = -1.7003 \times 10^{-3}$ $C_{13} = 2.3002 \times 10^{-3}$
     $C_{15} = 1.0031 \times 10^{-4}$  $C_{17} = -1.4993 \times 10^{-4}$ $C_{19} = -4.0151 \times 10^{-4}$
     $C_{21} = -1.0020 \times 10^{-4}$
Decentering [1]

Local coordinate system

X = 0.00    Y = 0.00    Z = 0.00
α = 45.00   β = 0.00    γ = 0.00
Defining coordinate system X = 0.00    Y = 0.00    Z = 0.00
α = −90.00  β = 0.00    γ = 0.00
Decentering [2]

Local coordinate system

X = 0.00    Y = 0.00    Z = 0.00
α = −45.00  β = 0.00    γ = 0.00
Defining coordinate system X = 0.00    Y = 0.00    Z = 0.00
α = 90.00   β = 0.00    γ = 0.00
Parameters of conditions f_tot (the focal length of the entire lens system) = 1.8884 mm
f_n (the focal length of the optical element unit with negative power) = −1.9704 mm
f_p (the focal length of the optical element unit with positive power) = 2.9396 mm
|f_n|/f_tot = 1.0434
f_p/f_tot = 1.5567
IH (image height) = 1.134 mm
2ω (angle of view) = 110.96°
Sk (the distance from the last optical surface to the imaging plane) = 6.0769 mm
Sk/f_tot = 3.21801
md (the maximum amount of deformation of the mirror surface)
             DM [1]: 1.38 μm       DM [2]: 2.03 μm
$C_{10}/C_8$    DM [1]: 0.125        DM [2]: 0.815
$|C_{13}/C_{11}|$  DM [1]: 0.721        DM [2]: 6.573
$|C_{15}/C_{11}|$  DM [1]: 1.041        DM [2]: 1.205
md/f_tot     DM [1]: 7.31 × 10⁻⁴   DM [2]: 1.08 × 10⁻³

Also, although in the above embodiments the peripheral portion of each deformable mirror is fixed, it need not necessarily be fixed and may be moved.

Polyimide is used as the substance of a film constituting the deformable mirror. It withstands disinfection peculiar to an endoscope, which is favorable.

The deformable mirror may be of either the electrostatic or electromagnetic driving type. In each of the above embodiments of three optical designs, the case where the geometric dimension is multiplied by the coefficient also falls within the scope of the present invention.

Although each of the above embodiments uses the deformable mirror in which the profile of the mirror surface is changed, a variable focal-length mirror may be used in which the profile of the mirror surface is not changed, but the optical property such as the focal length is varied. When the imaging area of the image sensor has a rectangular shape, the image sensor is placed so that its short side is nearly parallel with the Y-Z plane. This is advantageous for correction for off-axis aberration.

Even when the imaging optical system of the present invention is constructed with a variable focal-length lens instead of the deformable mirror, the same effect as in the deformable mirror can be brought about.

In the present invention, the optical system using the deformable mirror has been described. However, even in the case of an optical system using a planar or curved mirror whose shape is not changed, instead of using the deformable mirror, the above conditions and limitations may be applied unless otherwise noted. This is because the merit of compactness in a deflection optical system using the mirror is maintained as it is.

Although in the present invention the imaging optical system has been described, it may, of course, be used as a projection optical system or a display optical system by replacing the object surface with the imaging surface in each embodiment. Such an optical system comes into the category of the imaging optical system of the present invention.

Subsequently, a description will be given of examples of the structures of deformable mirrors and variable focal-length lenses as variable optical-property elements applicable to the imaging optical system of the present invention.

Figure 14:
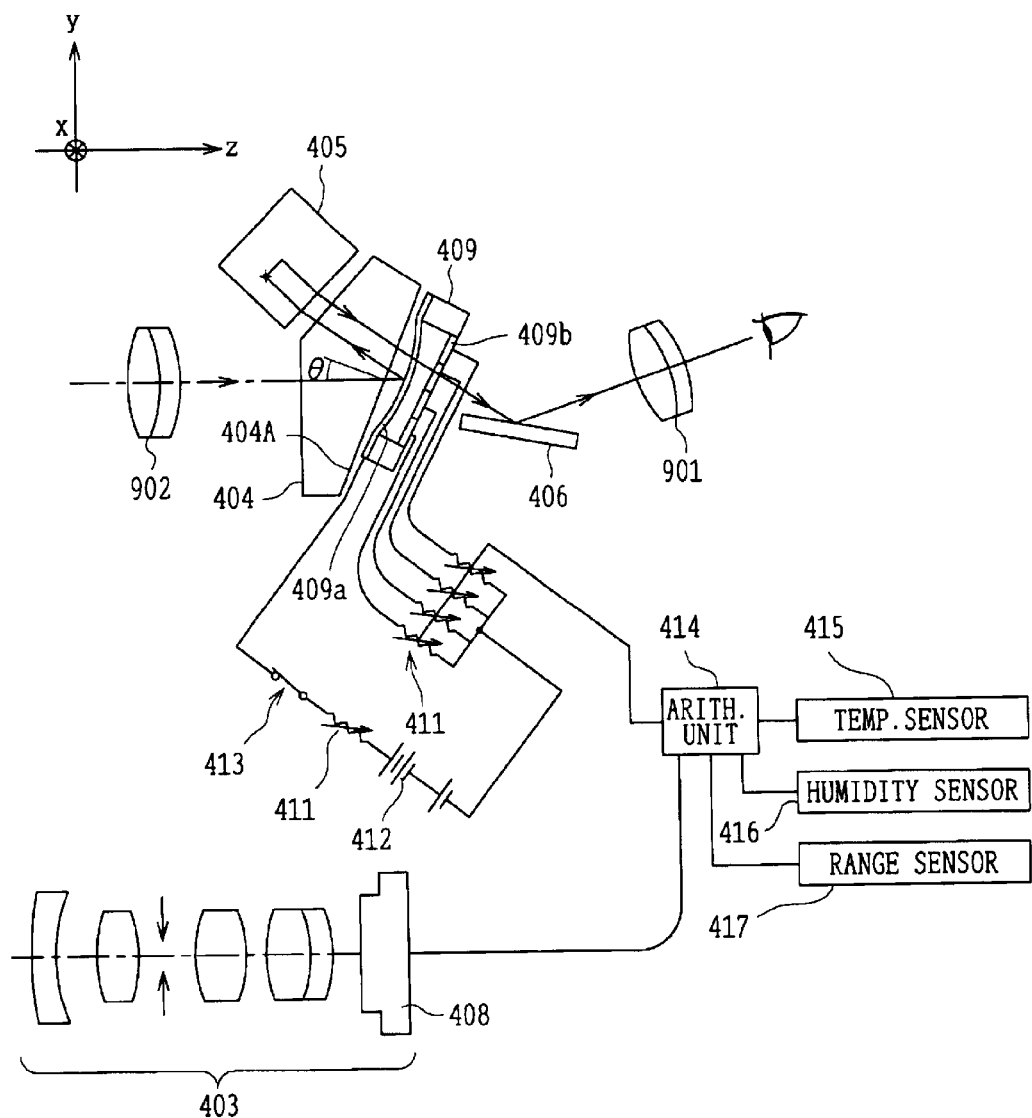
FIG. 14 is a diagram schematically showing a Keplerian finder for a digital camera provided with a variable optical-property mirror used in the imaging optical system of the present invention.

FIG. 14 shows a Keplerian finder for a digital camera using the deformable mirror which is applicable to the imaging optical system of the present invention. It can, of course, be used for a silver halide film camera. Reference is first made to the construction of a deformable mirror device 409 (hereinafter referred simply to as the deformable mirror).

The deformable mirror 409 is comprised of a thin film (reflecting surface) 409a coated with aluminum and a plurality of electrodes 409b. Reference numeral 411 denotes a plurality of variable resistors connected to the electrodes 409b; 412 denotes a power supply connected between the thin film 409a and the electrodes 409b through the variable resistors 411 and a power switch 413; 414 denotes an arithmetical unit for controlling the resistance values of the variable resistors 411; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

Figure 16:
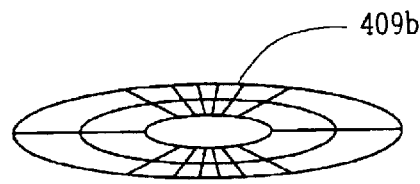
FIG. 16 is an explanatory view showing one aspect of electrodes used in the embodiment of FIG. 15.
Figure 17:
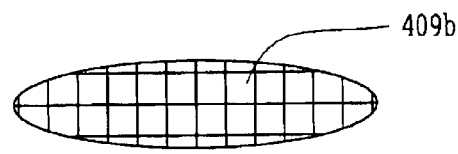
FIG. 17 is an explanatory view showing another aspect of electrodes used in the embodiment of FIG. 15.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when the voltage is applied across the plurality of electrodes 409b, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 901 and 902 and/or the prism 404, the isosceles rectangular prism 405, and the mirror 406, or the degradation of imaging performance by the expansion and deformation of a lens frame and assembly errors of parts, such as optical elements and frames. In this way, a focusing adjustment and correction for aberration produced by the focusing adjustment can be always properly made. Also, the configuration of the electrodes 409b, for example, as shown in FIG. 16 or 17, may be selected in accordance with the deformation of the thin film 409a.

According to the embodiment, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 14, a mark+on the optical path indicates that a ray of light travels toward the back side of the plane of the page), and is reflected by the mirror 406 to enter the eye through the eyepiece 901. As mentioned above, the lenses 901 and 902, the prisms 404 and 405, and the deformable mirror 409 constitute the observing optical system of the optical apparatus in the embodiment. The surface profile and thickness of each of these optical elements is optimized and thereby aberration can be minimized.

Specifically, the configuration of the thin film 409a, as the reflecting surface, is controlled in such a way that the resistance values of the variable resistors 411 are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411 so that voltages by which the configuration of the thin film 409a is determined are applied to the electrodes 409b. Thus, since the thin film 409a is deformed with the voltages applied to the electrodes 409b, that is, the electrostatic force, it assumes various shapes including an aspherical surface, according to circumstances. The range sensor 417 need not necessarily be used, and in this case, it is only necessary that an imaging lens 403 of the digital camera is moved so that a high-frequency component of an image signal from a solid-state image sensor 408 is roughly maximized, and the object distance is calculated from this position so that an observer's eye is able to focus upon the object image by deforming the deformable mirror.

When the thin film 409a is made of synthetic resin, such as polyimide, it can be considerably deformed even at a low voltage, which is advantageous. Also, the prism 404 and the deformable mirror 409 can be integrally configured into a unit.

Although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the photographing apparatus of the embodiment, the lenses 901 and 902 are arranged separately from the prism 404. However, if the prisms 404 and 405, the mirror 406, and the deformable mirror 409 are designed so that aberration can be eliminated without providing the lenses 901 and 902, the prisms 404 and 405 and the deformable mirror 409 will be configured as one optical block, and the assembly is facilitated. Parts or all of the lenses 901 and 902, the prisms 404 and 405, and the mirror 406 may be made of glass. By doing so, a photographing apparatus with a higher degree of accuracy is obtained.

Also, although in FIG. 14 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

Figure 15:
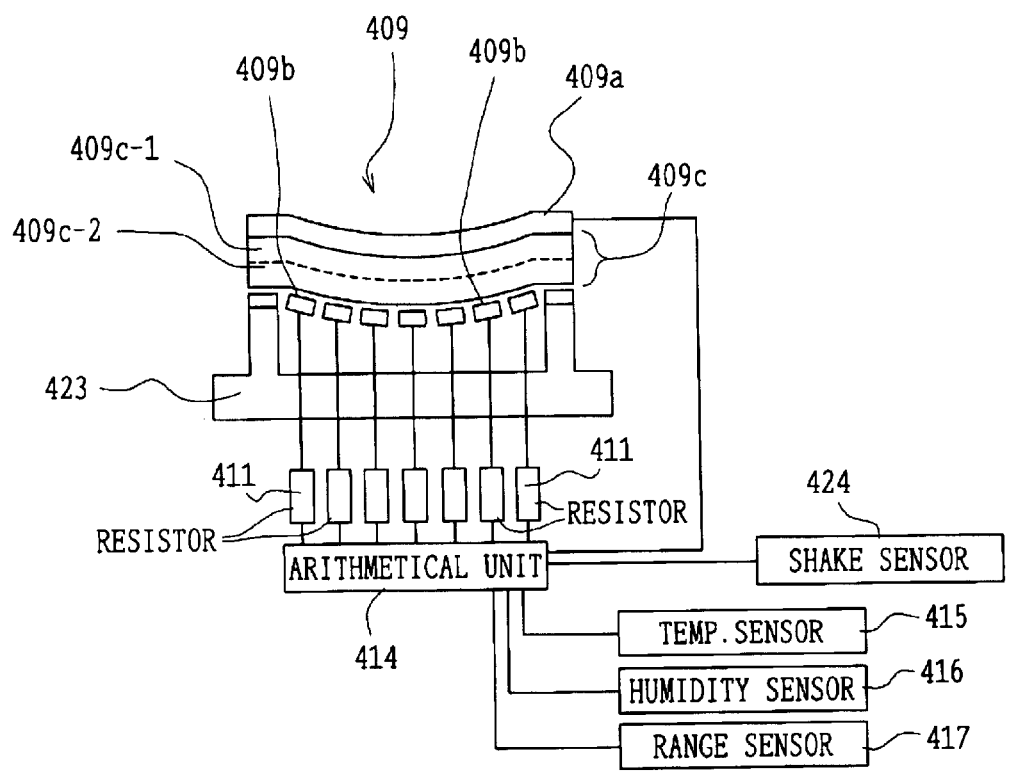
FIG. 15 is a diagram schematically showing another embodiment of the variable optical-property mirror.

FIG. 15 shows another embodiment of the deformable mirror 409 according to the present invention. In this embodiment, a piezoelectric element 409c is interposed between the thin film 409a and the electrodes 409b, and these are placed on a support 423. A voltage applied to the piezoelectric element 409c is changed in accordance with the individual electrodes 409b, and thereby the piezoelectric element 409c causes expansion or contraction which is partially different so that the shape of the thin film 409a can be changed. The configuration of the electrodes 409b, as illustrated in FIG. 16, may have a concentric division pattern, or as in FIG. 17, may be a rectangular division pattern. As other patterns, proper configurations can be chosen. In FIG. 15, reference numeral 424 represents a shake sensor connected to the arithmetical unit 414. The shake sensor 424, for example, detects the shake of a digital camera and changes the voltages applied to the electrodes 409b through the arithmetical unit 414 and the variable resistors 411 in order to deform the thin film 409a to compensate for the blurring of an image caused by the shake. At this time, the signals from the temperature sensor 415, the humidity sensor 416, and the range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

Figure 18:
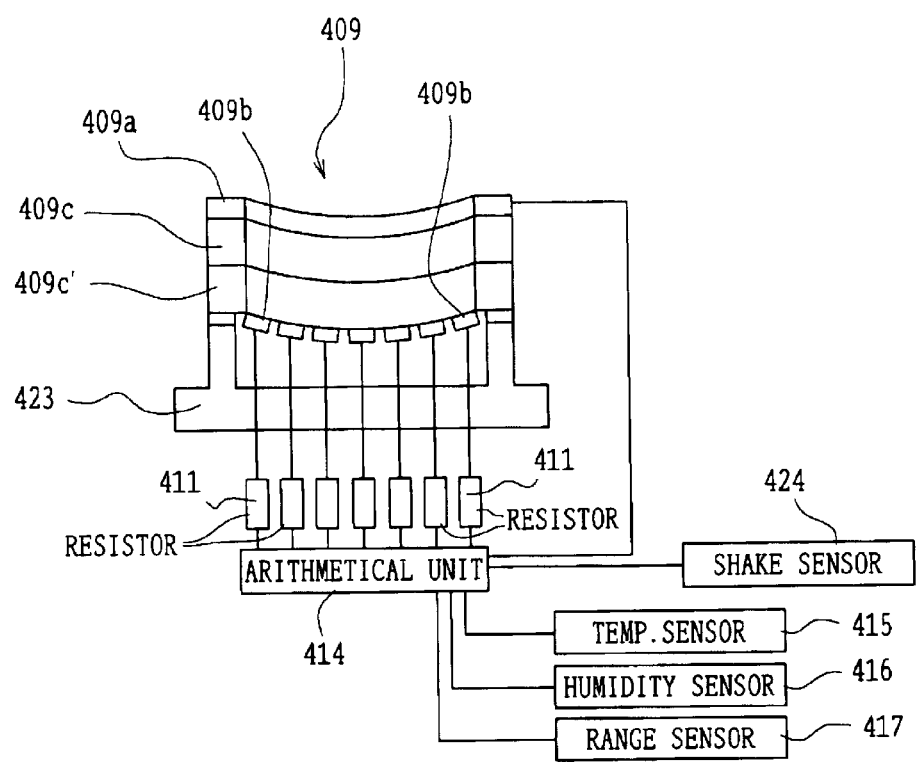
FIG. 18 is a view schematically showing another embodiment of the variable optical-property mirror.

FIG. 18 shows another embodiment of the deformable mirror 409 according to the present invention.

This embodiment has the same construction as the embodiment of FIG. 15 with the exception that two piezoelectric elements 409c and 409c' are interposed between the thin film 409a and the electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film 409a becomes stronger than in the embodiment of FIG. 15 and as a result, the shape of the mirror surface can be considerably changed.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When the piezoelectric elements are used, it is also possible to properly deform the thin film 409a in the above embodiment if their thicknesses are made uneven.

For materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

Figure 19:
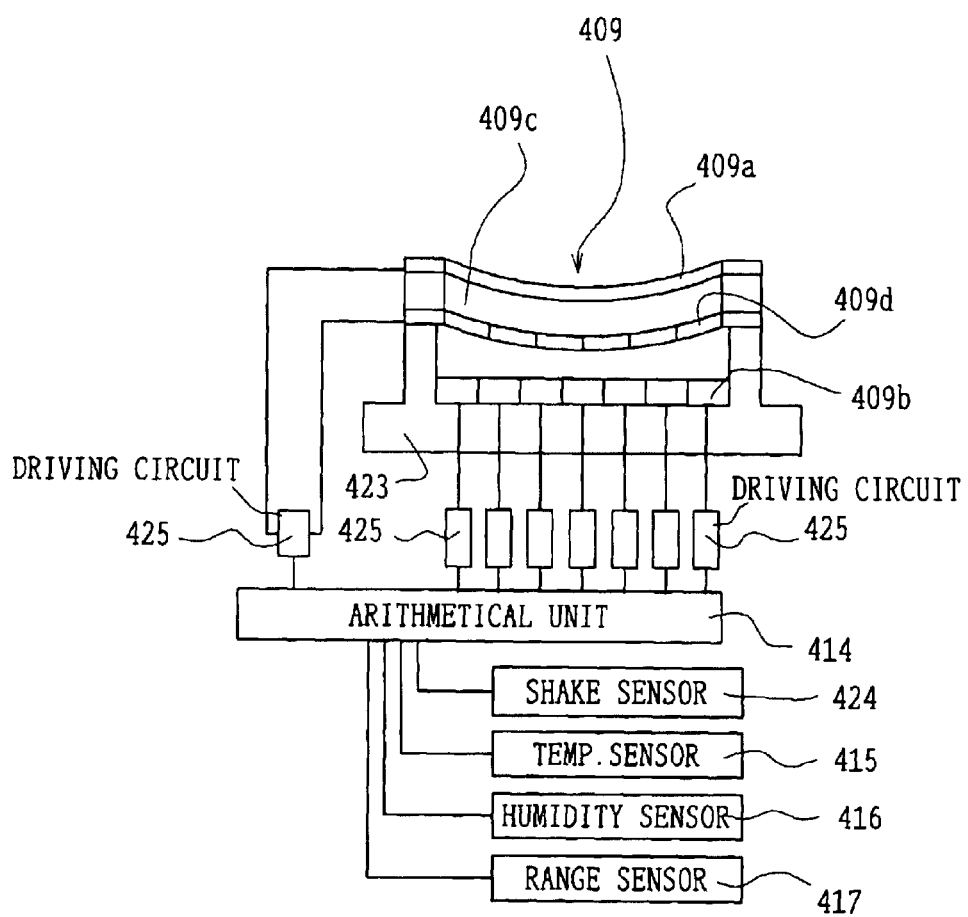
FIG. 19 is a view schematically showing another embodiment of the variable optical-property mirror.

When an electrostrictive substance, for example, acrylic elastomer or silicon rubber, is used for the piezoelectric element 409c shown in FIGS. 15 and 19, the piezoelectric element 409c, as indicated by a broken line in FIG. 15, may be constructed by cementing another substrate 409c-1 to an electrostrictive substance 409c-2.

FIG. 19 shows another embodiment of the deformable mirror 409 used as the variable mirror according to the present invention.

The deformable mirror of this embodiment is designed so that the piezoelectric element 409c is sandwiched between the thin film 409a and an electrode 409d, and voltages are applied between the thin film 409a and the electrode 409d through a driving circuit 425 controlled by the arithmetical unit 414. Furthermore, voltages are also applied to the electrodes 409b provided on the support 423, through driving circuits 425 controlled by the arithmetical unit 414. In this embodiment, therefore, the thin film 409a can be doubly deformed by electrostatic forces due to the voltages applied between the thin film 409a and the electrode 409d and applied to the electrodes 409b. There are advantages that various deformation patterns can be provided and the response is quick, compared with any of the above embodiments.

By changing the signs of the voltages applied between the thin film 409a and the electrode 409d, the deformable mirror can be deformed into a convex or concave surface. In this case, a considerable deformation of the mirror surface may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 409d may be constructed as a plurality of electrodes like the electrodes 409b. This condition is shown in FIG. 19. In the present invention, all of the piezoelectric effect, the electrostrictive effect, and electrostriction are generally called the piezoelectric effect. Thus, it is assumed that the electrostrictive substance is included in the piezoelectric substance.

Figure 20:
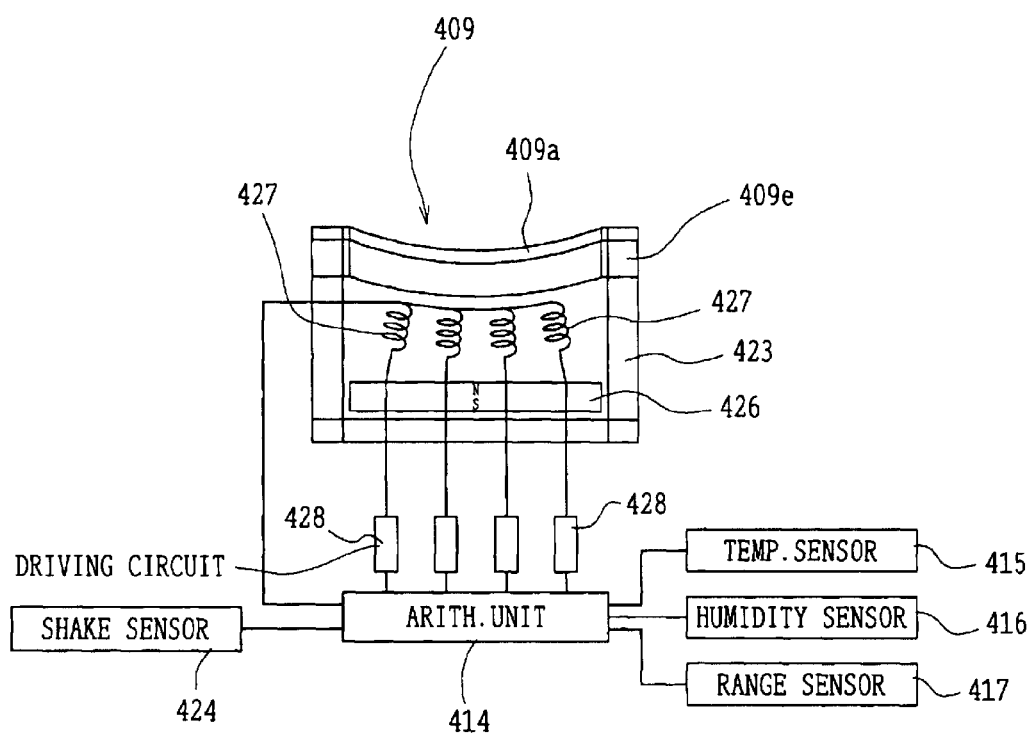
FIG. 20 is a view schematically showing another embodiment of the variable optical-property mirror.

FIG. 20 shows another embodiment of the deformable mirror 409 according to the present invention. The deformable mirror of this embodiment is designed so that the shape of the mirror surface can be changed by utilizing an electromagnetic force. A permanent magnet 426 mounted and fixed on a bottom surface inside the support 423, and the periphery of a substrate 409e made with, silicon nitride or polyimide is mounted on the top surface thereof. The thin film 409a consisting of the coating of metal, such as aluminum, is deposited on the surface of the substrate 409e, thereby constituting the deformable mirror 409. Below the substrate 409*e*, a plurality of coils 427 are arranged and connected to the arithmetical unit 414 through the driving circuits 428. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409*e* and the thin film 409*a*.

In this case, a different amount of current can also be caused to flow through each of the coils 427. A single coil 427 may be used, and the permanent magnet 426 may be provided on the substrate 409*e* so that the coils 427 are arranged on the bottom side in the support 423. It is desirable that the coils 427 are fabricated by a lithography process. A ferromagnetic core (iron core) may be encased in each of the coils 427.

Figure 21:
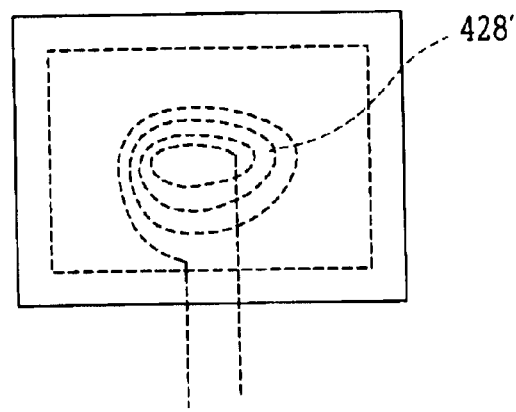
FIG. 21 is an explanatory view showing the winding density of a thin-film coil in the embodiment of FIG. 20.

In this case, each of the coils 427, as illustrated in FIG. 21, can be designed so that a coil density varies with place and thereby a desired deformation is brought to the substrate 409*e* and the thin film 409*a*. A single coil 427 may be used, and a ferromagnetic core (iron core) may be encased in each of the coils 427.

Figure 22:
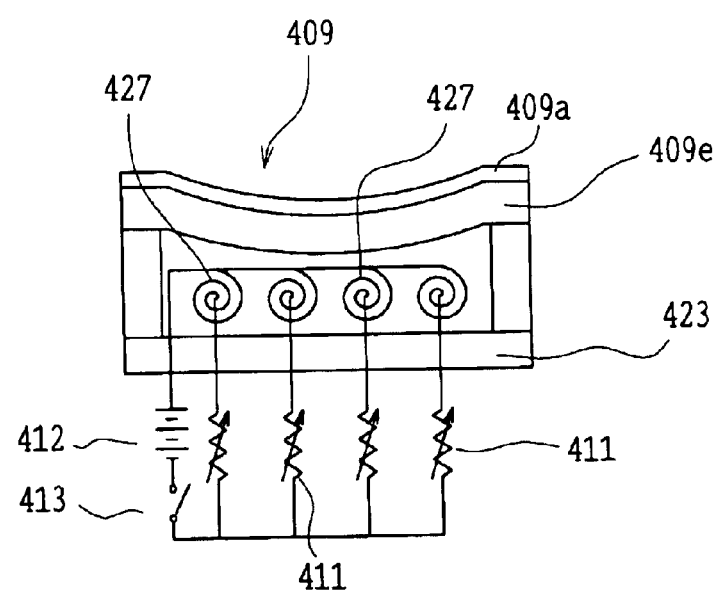
FIG. 22 is a view schematically showing another embodiment of the variable optical-property mirror.

FIG. 22 shows another embodiment of the deformable mirror 409 according to the present invention.

Figure 23:
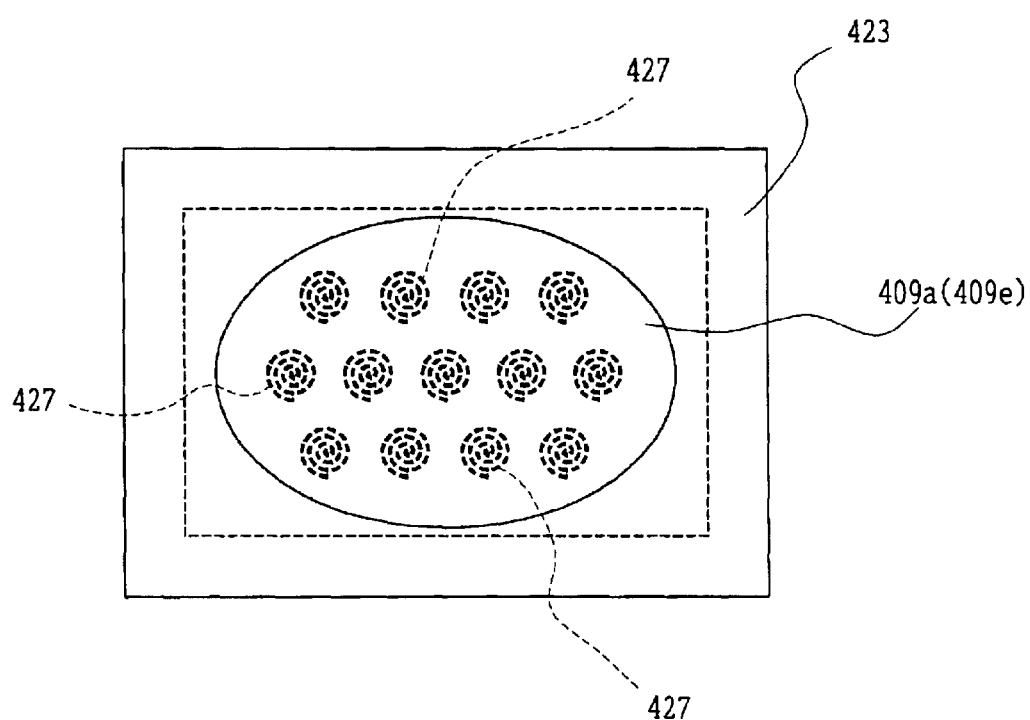
FIG. 23 is an explanatory view showing an example of an array of coils in the embodiment of FIG. 22.
Figure 24:
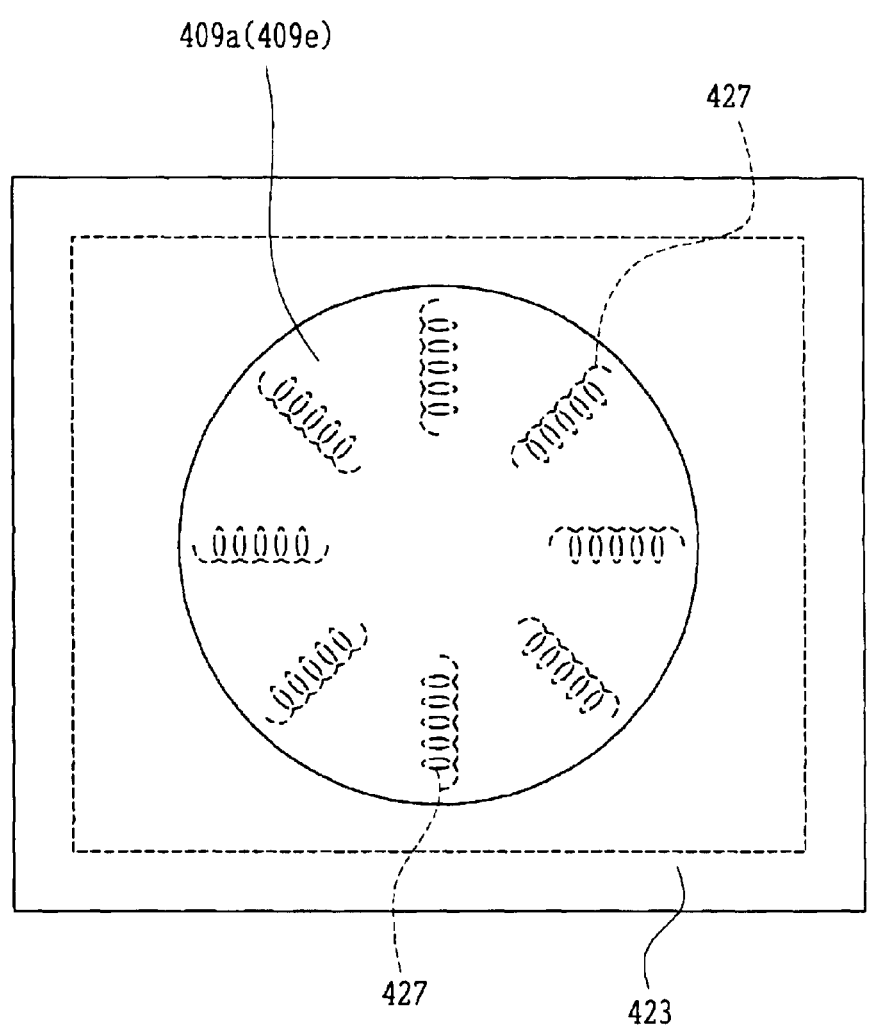
FIG. 24 is an explanatory view showing another example of the array of coils in the embodiment of FIG. 22.
Figure 25:
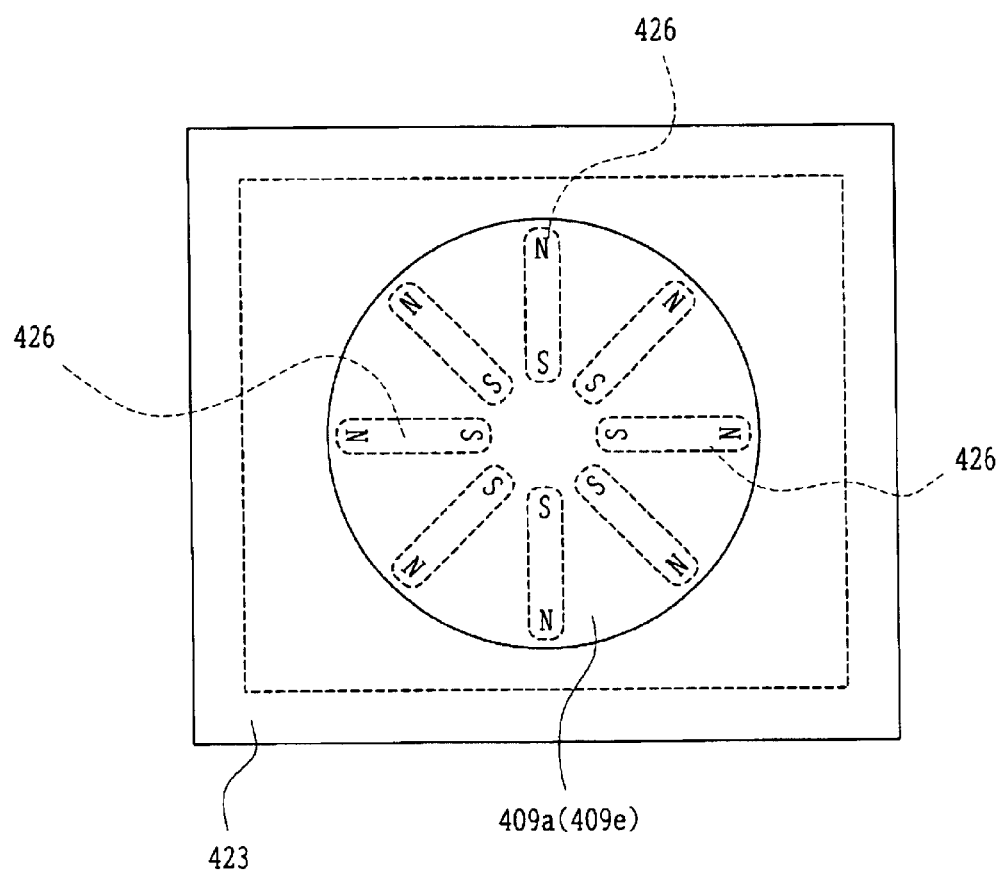
FIG. 25 is an explanatory view showing an array of permanent magnets suitable for the array of coils of FIG. 24 in the embodiment of FIG. 22.

In the deformable mirror of this embodiment, the substrate 409*e* is made with a ferromagnetic such as iron, and the thin film 409*a* as a reflecting film is made with aluminum. In this case, since the thin film coils need not be used, the structure is simple and the manufacturing cost can be reduced. If the power switch 413 is replaced with a changeover and power on-off switch, the directions of currents flowing through the coils 427 can be changed, and the configuration of the substrate 409*e* and the thin film 409*a* can be changed at will. FIG. 23 shows an array of the coils 427 in this embodiment, and FIG. 24 shows another array of the coils 427. These arrays are also applicable to the embodiment of FIG. 20. FIG. 25 shows an array of the permanent magnets 426 suitable for the array of the coils of FIG. 24 in the embodiment of FIG. 20. Specifically, when the permanent magnets 426, as shown in FIG. 25, are radially arranged, a delicate deformation can be provided to the substrate 409*e* and the thin film 409*a* in contrast with the embodiment of FIG. 20. As mentioned above, when the electromagnetic force is used to deform the substrate 409*e* and the thin film 409*a* (in the embodiments of FIGS. 20 and 22), there is the advantage that they can be driven at a lower voltage than in the case where the electrostatic force is used.

Some embodiments of the deformable mirror have been described, but as shown in FIG. 19, at least two kinds of forces may be used in order to change the shape of the deformable mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 26:
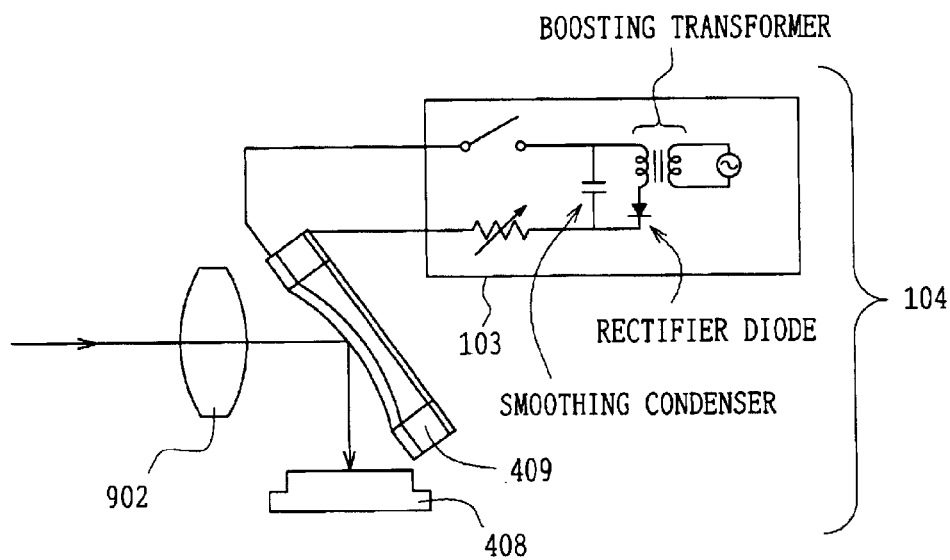
FIG. 26 is a view schematically showing an imaging system which uses the variable optical-property mirror applicable to the imaging optical system of the present invention, for example, an imaging system used in a digital camera of a cellular phone, a capsule endoscope, an electronic endoscope, a digital camera for personal computers, or a digital camera for PDAs.

FIG. 26 shows another embodiment of the present invention. This embodiment is the imaging optical system applied, for example, to a digital camera of a cellular phone, a capsule endoscope, an electronic endoscope, a digital camera for personal computers, or a digital camera for PDAs, using the using the deformable mirror 409.

In this embodiment, one imaging device 104 is constructed with the deformable mirror 409, the lens 902, the solid-state image sensor 408, and a control system 103. In the imaging device 104 of the embodiment, light from an object passing through the lens 902 is condensed by the deformable mirror 409 and is imaged on the solid-state image sensor 408. The deformable mirror 409 is a kind of variable optical-property element and is also referred to as a variable focal-length mirror.

According to this embodiment, even when the object distance is changed, the mirror surface of the deformable mirror 409 is deformed and thereby the object can be brought into a focus. The embodiment need not use the motor to move the lens and excels in compact and lightweight design and low power consumption. The imaging device 104 can be used in any of the embodiments as the imaging system of the present invention. When a plurality of deformable mirrors 409 are used, a zoom or variable magnification imaging system or optical system can be constructed.

In FIG. 26, an example of a control system which includes the boosting circuit of a transformer using coils in the control system 103 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Figure 27:
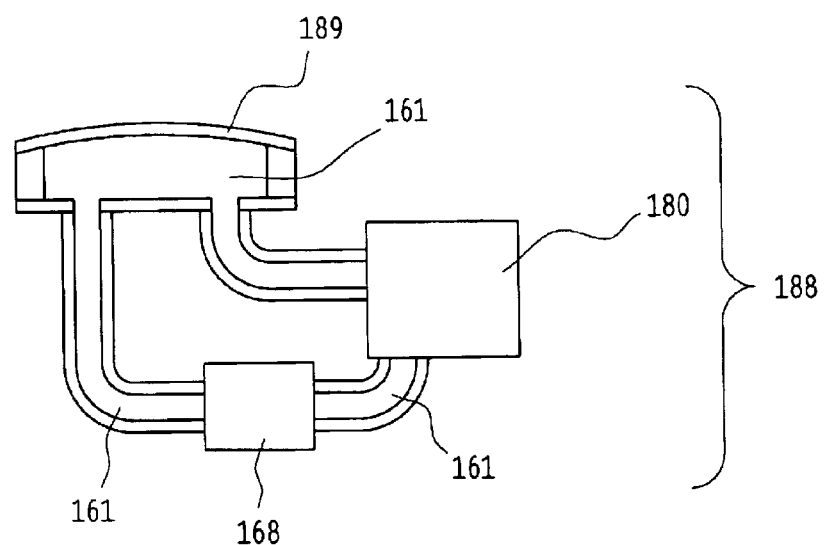
FIG. 27 is a view schematically showing the variable optical-property mirror in which a fluid is taken in and out by a micropump to deform a mirror surface.

FIG. 27 shows the deformable mirror 188 in which a fluid 161 is taken in and out by a micropump 180 to deform a mirror surface, in another embodiment of the deformable mirror of the present invention. According to this embodiment, there is the merit that the mirror surface can be considerably deformed.

The micropump 180 is a small-sized pump, for example, made by a micro-machining technique and is constructed so that it is operated with an electric power.

As examples of pumps made by the micromachining technique, there are those which use thermal deformations, piezoelectric substances, and electrostatic forces.

Figure 28:
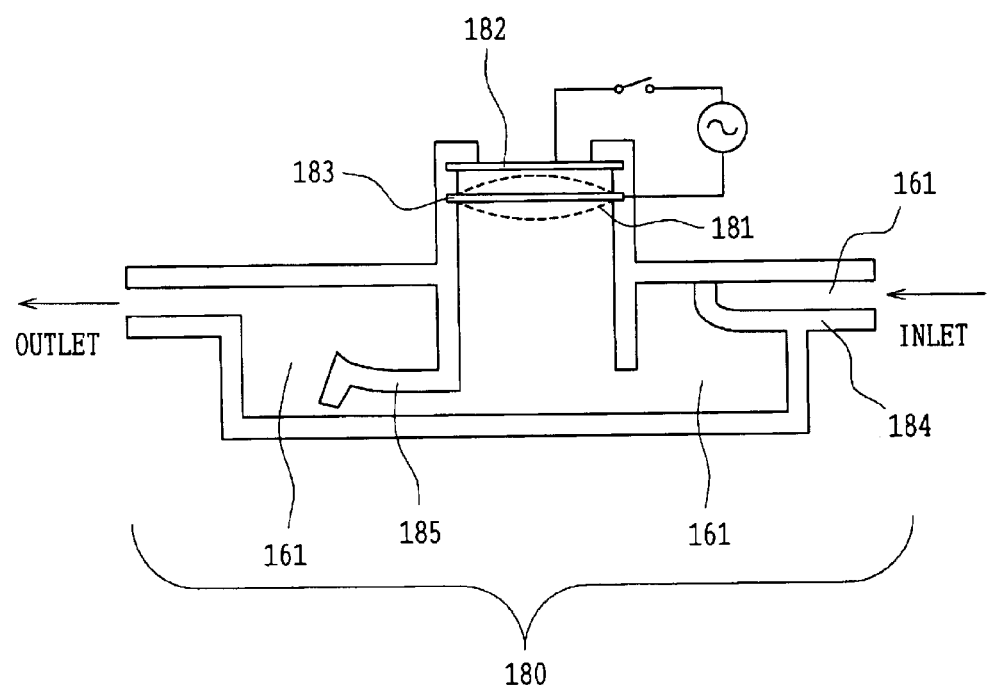
FIG. 28 is a view schematically showing one embodiment of the micropump applicable to the variable optical-property mirror used in the imaging optical system of the present invention.

FIG. 28 shows one embodiment of a micropump applicable to the deformable mirror used in the imaging optical system of the present invention. In the micropump 180 of the embodiment, a vibrating plate 181 is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the micropump of this embodiment, the reflecting film 181 is deformed into a concave or convex surface in accordance with the amount of the fluid 161, and thereby functions as the deformable mirror. The deformable mirror is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 26, it is desirable that the boosting transformer or the piezoelectric transformer is used to constitute the control system.

If the thin film 409*a* for reflection is also provided in a portion which is not deformed, it can be used as a reference surface when the profile of the deformable mirror is measured by an interferometer, which is convenient.

Figure 29:
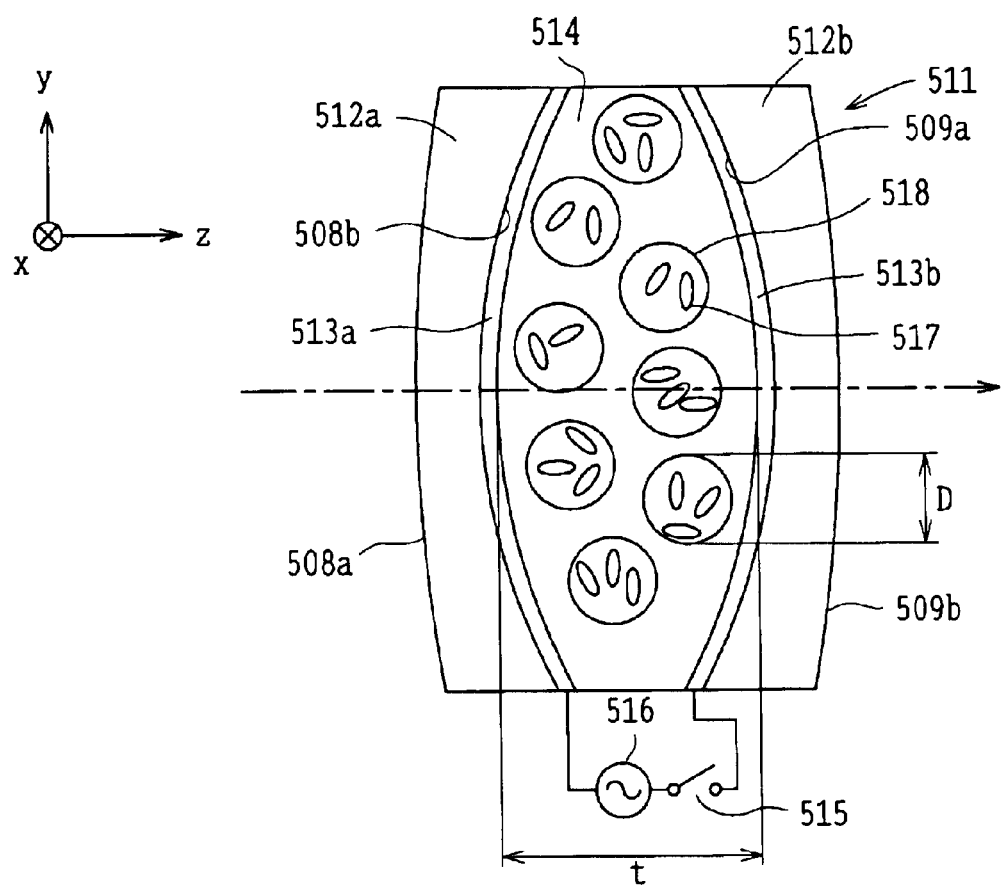
FIG. 29 is a view showing the principal structure of a variable focal-length lens which can be used in the imaging optical system of the present invention.

FIG. 29 shows the principal structure of a variable focal-length lens used in the imaging optical system according to the present invention. A variable focal-length lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses through transparent electrodes 513a and 513b. Incident light is converged through the first and second lenses 512a and 512b. The transparent electrodes 513a and 513b are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and its volume is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wavelength of light used is denoted by λ, the average diameter D is chosen to satisfy the following condition:

$$2\ nm \leq D \leq \lambda/5 \quad (22)$$

That is, the size of each of the liquid crystal molecules 517 is at least about 2 nm and thus the lower limit of the average diameter D is set to about 2 nm or larger. The upper limit of the diameter D depends on a thickness t of the macromolecular dispersed liquid crystal layer 514 in the direction of the optical axis of the variable focal-length lens 511. However, if the diameter is larger than the wavelength λ, a difference between the refractive indices of the macromolecules and the liquid crystal molecules 517 will cause light to be scattered at the interfaces of the macromolecular cells 518 and will render the liquid crystal layer 514 opaque. Hence, the upper limit of the diameter D should be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 514 deteriorates with increasing thickness t.

Figure 30:
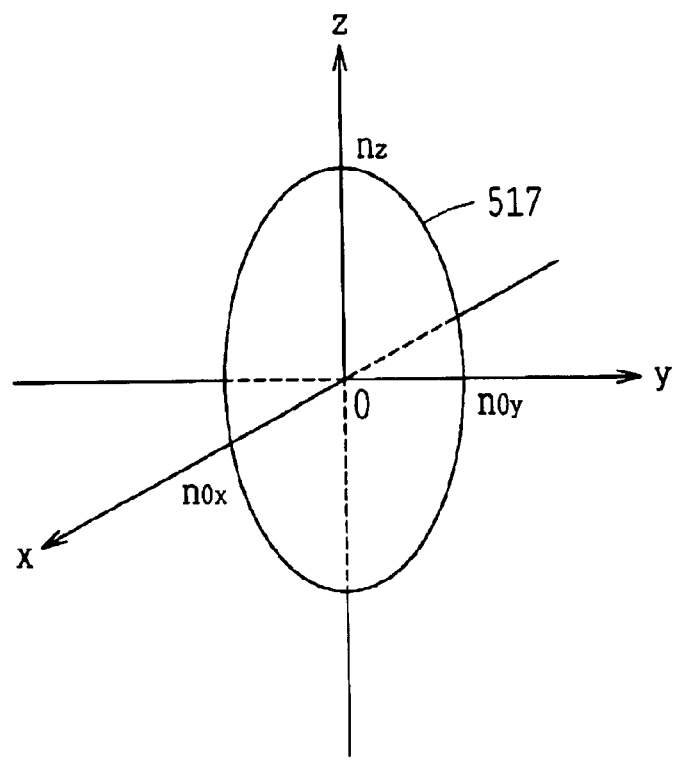
FIG. 30 is a view showing the index ellipsoid of a nematic liquid crystal of uni-axial anisotropy.

In the liquid crystal molecules 517, for example, uniaxial nematic liquid crystal molecules are used. The index ellipsoid of each of the liquid crystal molecules 517 is as shown in FIG. 30. That is, $$n_{ox} = n_{oy} = n_O \quad (23)$$

where $n_o$ is the refractive index of an ordinary ray and $n_{ox}$ and $n_{oy}$ are refractive indices in directions perpendicular to each other in a plane including ordinary rays.

Figure 31:
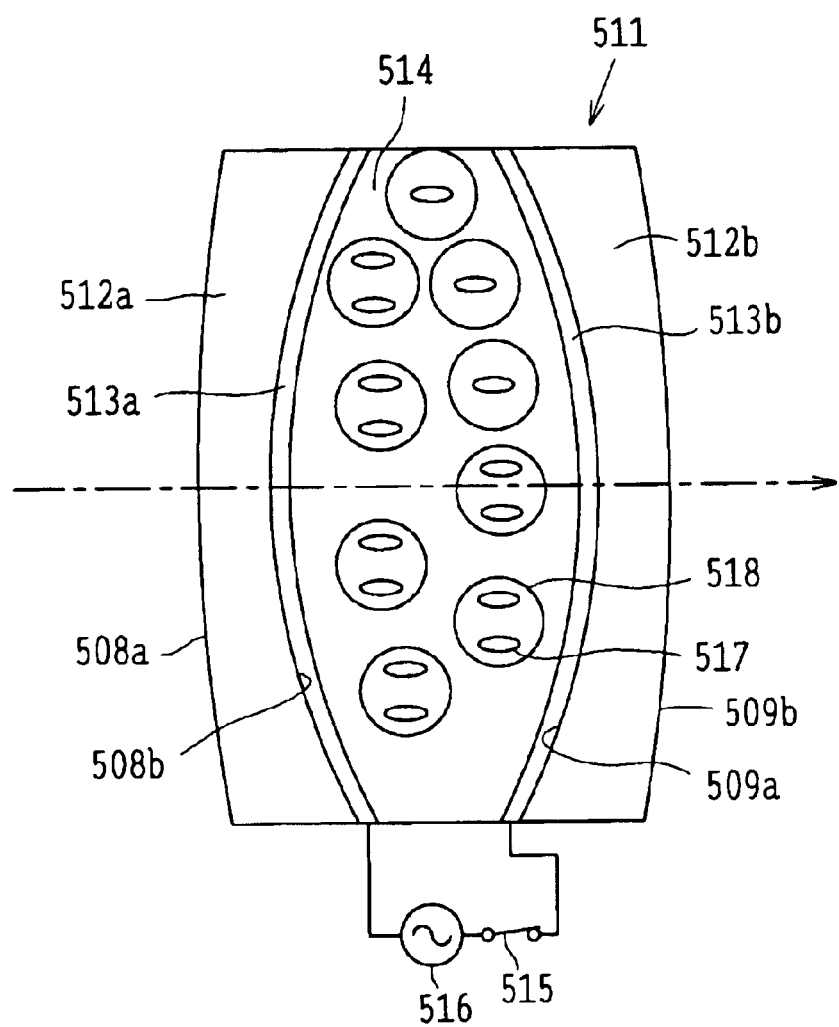
FIG. 31 is a view showing a state where an electric field is applied to a macro-molecular dispersed liquid crystal layer in FIG. 29.

Here, in the case where the switch 515, as shown in FIG. 29 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 31, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 32:
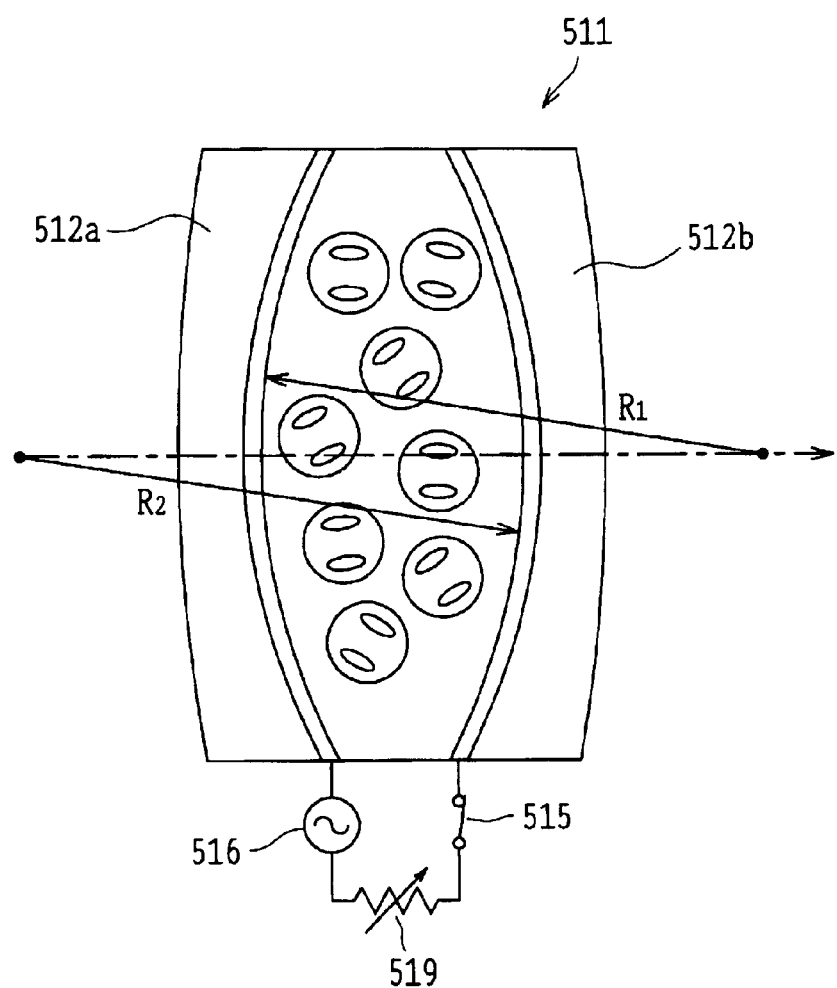
FIG. 32 is a view showing an example where a voltage applied to the macro-molecular dispersed liquid crystal layer in FIG. 29 can be changed.

The voltage applied to the macromolecular dispersed liquid crystal layer 514, for example, as shown in FIG. 32, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 29, that is, in the case where the electric field is not applied to the macromolecular dispersed liquid crystal layer 514, when the refractive index in the direction of the major axis of the index ellipsoid, as shown in FIG. 30, is denoted by $n_z$, an average refractive index $n_{LC}'$ of the liquid crystal molecules 517 is roughly given by $$(n_{ox} + n_{oy} + n_z)/3 = n_{LC}' \quad (24)$$

Also, when the refractive index $n_z$ is expressed as a refractive index $n_e$ of an extraordinary ray, an average refractive index $n_{LC}$ where Equation (23) is established is given by $$(2n_o + n_e)/3 = n_{LC} \quad (25)$$

In this case, when the refractive index of each of the macromolecules constituting the macromolecular cells 518 is represented by $n_p$, and the ratio of volume between the liquid crystal layer 514 and the liquid crystal molecules 517 is represented by ff, a refractive index $n_A$ of the liquid crystal layer 514 is given from the Maxwell-Garnet's law as $$n_A = ff \cdot n_{LC}' + (1-ff)n_p \quad (26)$$

Thus, as shown in FIG. 32, when the radii of curvature of the inner surfaces of the lenses 512a and 512b, that is, the surfaces on the side of the liquid crystal layer 514, are represented by $R_1$ and $R_2$, a focal length $f_1$ of the variable focal-length lens 511 is given by $$1/f_1 = (n_A - 1)(1/R_1 - 1/R_2) \quad (27)$$

Also, when the center of curvature is located on the image side, it is assumed that the radius of curvature $R_1$ or $R_2$ is positive. Refraction caused by the outer surface of each of the lenses 512a and 512b is omitted. That is, the focal length of the lens of only the liquid crystal layer 514 is given by Equation (27).

When the average refractive index of ordinary rays is expressed as $$(n_{ox} + n_{oy})/2 = n_o' \quad (28)$$

a refractive index $n_B$ of the liquid crystal layer 514 in the case of FIG. 31, namely, in the case where the electric field is applied to the liquid crystal layer 514, is given by $$n_B = ff \cdot n_o' + (1-ff)n_p \quad (29)$$

and thus a focal length $f_2$ of the lens of only the liquid crystal layer 514 in this case is given by $$1/f_2 = (n_B - 1)(1/R_1 - 1/R_2) \quad (30)$$

Also, the focal length where a lower voltage than in FIG. 31 is applied to the liquid crystal layer 514 is a value between the focal length $f_1$ given by Equation (27) and the focal length $f_2$ by Equation (30).

From Equations (27) and (30), a change rate of the focal length by the liquid crystal layer 514 is given by $$|(f_2-f_1)/f_2|=|(n_B-n_A)/(n_B-1)| \qquad (31)$$

Thus, in order to increase the change rate, it is only necessary to increase the value of $|(n_B-n_A)|$. Here, $$n_B-n_A=f\!f(n_o'-n_{LC}') \qquad (32)$$

and hence if the value of $|n_o'-n_{LC}'|$ is increased, the change rate can be raised. Practically, since the refractive index $n_B$ is about 1.3–2, the value of $|n_o'-n_{LC}'|$ is chosen so as to satisfy the following condition:

$$0.01 \leq |n_o'-n_{LC}'| \leq 10 \qquad (33)$$

In this way, when ff=0.5, the focal length obtained by the liquid crystal layer 514 can be changed by at least 0.5%, and thus an effective variable focal-length lens can be realized. Also, the value of $|n_o'-n_{LC}'|$ cannot exceed 10 because of restrictions on liquid crystal substances.

Subsequently, a description will be given of grounds for the upper limit of Condition (22). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance s in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ7.5 μm).

From these results, the transmittance τ becomes at least 70–80% and the liquid crystal can be actually used as a lens, if the liquid crystal satisfies the following condition:

$$D \cdot t \leq \lambda \cdot 15 \; \mu m \qquad (34)$$

Hence, for example, in the case of t=75 μm, if D≦λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, the values of the refractive indices $n_o'$ and $n_p$ are different from each other, the transmittance of the liquid crystal layer 514 will be degraded. In FIGS. 29 and 31, the transmittance of the liquid crystal layer 514 is improved on an average when the liquid crystal layer 38 satisfies the following equation:

$$n_p=(n_o'+n_{LC}')/2 \qquad (35)$$

The variable focal-length lens 511 is used as a lens, and thus in both FIGS. 29 and 31, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \qquad (36)$$

When Equation (35) is satisfied, Condition (34) is moderated and it is only necessary to satisfy the following condition:

$$D \cdot t \leq \lambda \cdot 60 \; \mu m \qquad (37)$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \; \mu m \cdot (1.585-1.45)^2/(n_u-n_p)^2 \qquad (38)$$

where $(n_u-n_p)^2$ is a value when one of $(n_{LC}'-n_p)^2$ and $(n_o'-n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq f\!f \leq 0.999 \qquad (39)$$

On the other hand, the transmittance r improves as the ratio ff becomes low, and hence Condition (38) may be moderated, preferably, as follows:

$$4 \times 10^{-6} [\mu m]^2 \leq D \cdot t \leq \lambda \cdot 45 \; \mu m \cdot (1.585-1.45)^2/(n_u-n_p)^2 \qquad (40)$$

Also, the lower limit of the thickness t, as is obvious from FIG. 29, corresponds to the diameter D, which is at least 2 nm as described above, and therefore the lower limit of D·t becomes $(2 \times 10^{-3} \; \mu m)^2$, namely $4 \times 10^{-6} \; [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7 \; nm \leq D \leq 500 \; \lambda \qquad (41)$$

Figure 33:
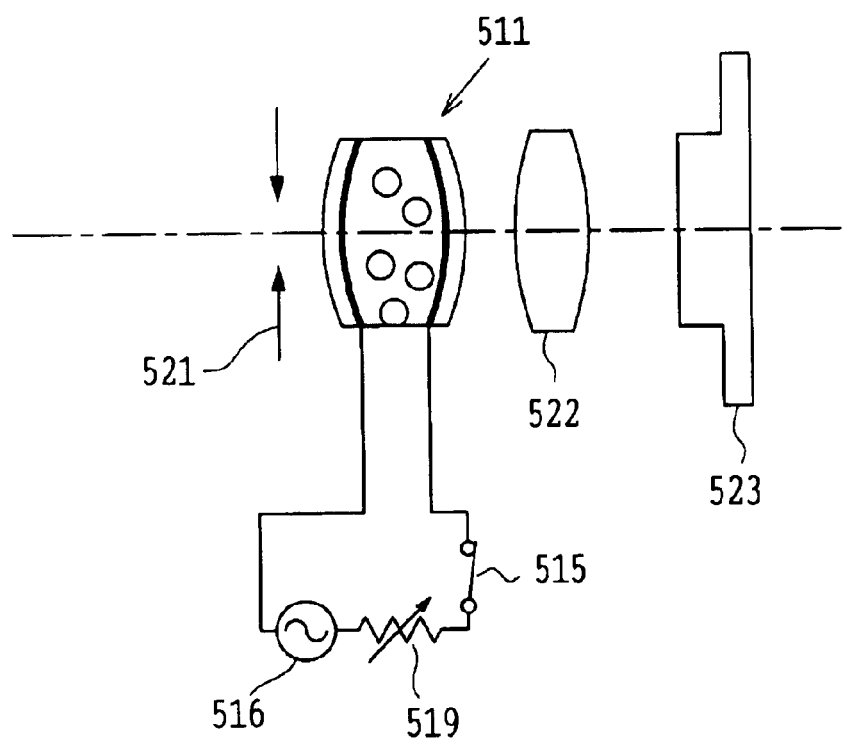
FIG. 33 is a view showing the construction of an imaging optical system for digital cameras which uses the variable focal-length lens of FIG. 32.

FIG. 33 shows an imaging optical system for digital cameras using the variable focal-length lens 511 of FIG. 32. In this imaging optical system, an image of an object (not shown) is formed on the solid-state image sensor 523, such as a CCD, through a stop 521, the variable focal-length lens 511, and a lens 522. Also, in FIG. 33, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal length of the variable focal-length lens 511. Whereby, without moving the variable focal-length lens 511 and the lens 522 along the optical axis, it becomes possible to perform continuous focusing (namely bring the object into a focus) with respect to the object distance, for example, from the infinity to 600 mm.

Figure 34:
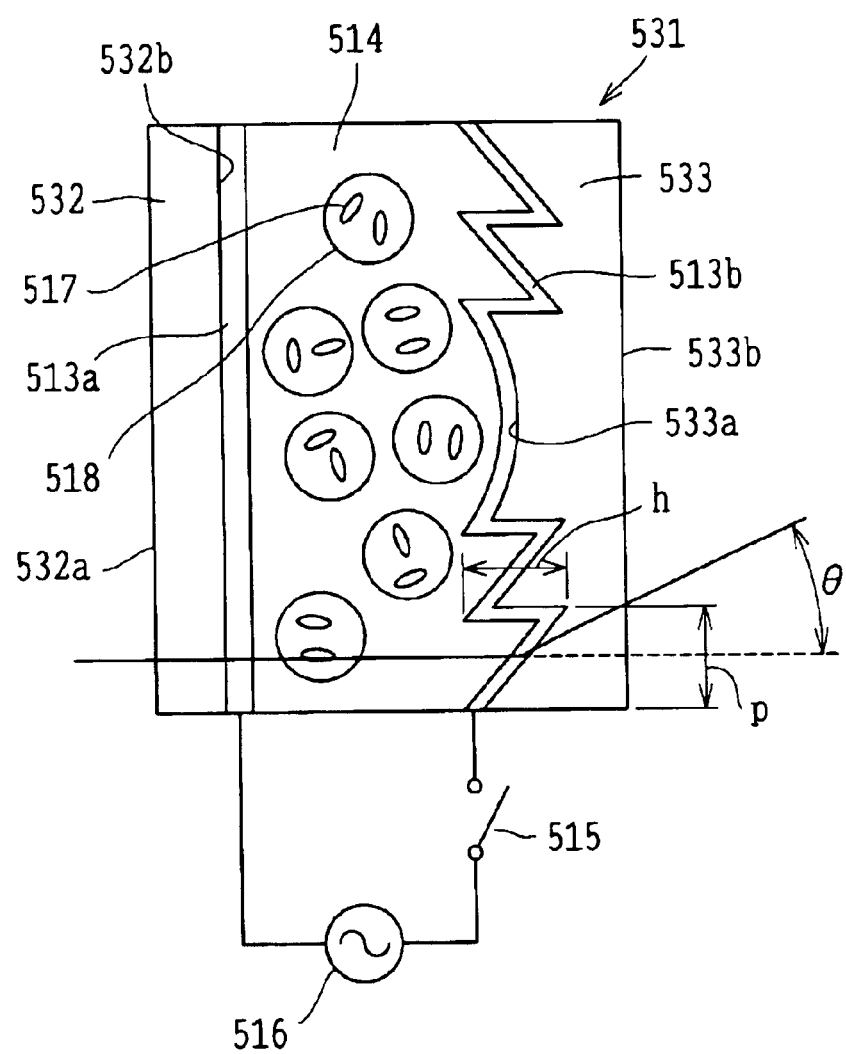
FIG. 34 is a view showing an example of a variable focal-length diffraction optical element applicable to the imaging optical system according to the present invention.

FIG. 34 shows one example of a variable focal-length diffraction optical element as the variable optical-property element applicable to the imaging optical system according to the present invention.

This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 29, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current electric field is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m \lambda \tag{42}$$

and emerges therefrom. When the depth of the groove is denoted by h, the refractive index of the transparent substrate 533 is denoted by $n_{533}$, and an integer is denoted by k, a diffraction efficiency becomes 100% at the wavelength λ and the production of flare can be prevented by satisfying the following equations:

$$h(n_A - n_{533}) = m\lambda \tag{43}$$

$$h(n_B - n_{533}) = k\lambda \tag{44}$$

Here, the difference in both sides between Equations (43) and (44) is given by $$h(n_A - n_B) = (m - k)\lambda \tag{45}$$

Therefore, when it is assumed that λ=500 nm, $n_A$=1.55, and $n_B$=1.5, $$0.05\ h = (m-k) \cdot 500\ nm$$

and when m=1 and k=0, $$h = 10000\ nm = 10\ \mu m$$

In this case, the refractive index $n_{533}$ of the transparent substrate 533 is obtained as 1.5 from Equation (43). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In the embodiment, it is only necessary that Equations (43)–(45) are set in practical use to satisfy the following conditions:

$$0.7\ m\lambda \leq h(n_A - n_{533}) \leq 1.4\ m\lambda \tag{46}$$

$$0.7\ k\lambda \leq h(n_A - n_{533}) \leq 1.4\ k\lambda \tag{47}$$

$$0.7(m-k)\lambda \leq h(n_A - n_B) \leq 1.4(m-k)\lambda \tag{48}$$

Figure 35:
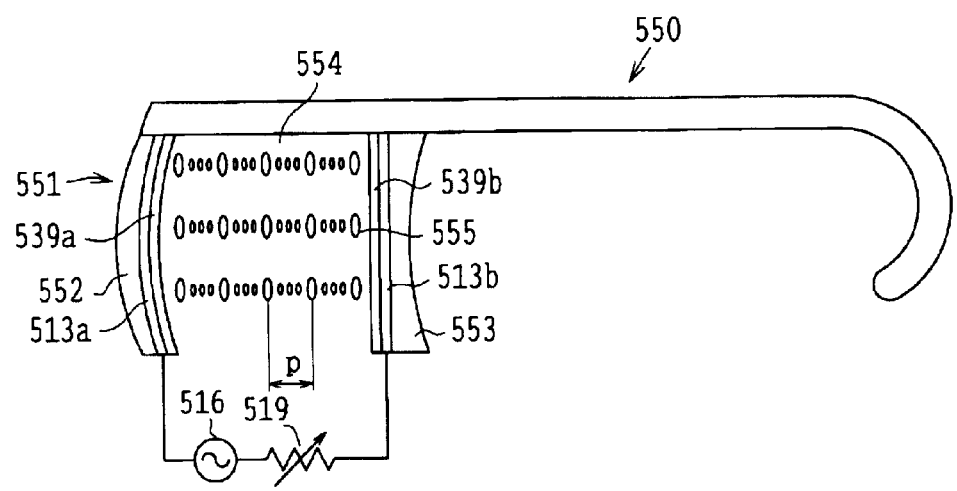
FIG. 35 is a view showing variable focal-length spectacles, each having a variable focal-length lens which uses a twisted nematic liquid crystal.
Figure 36:
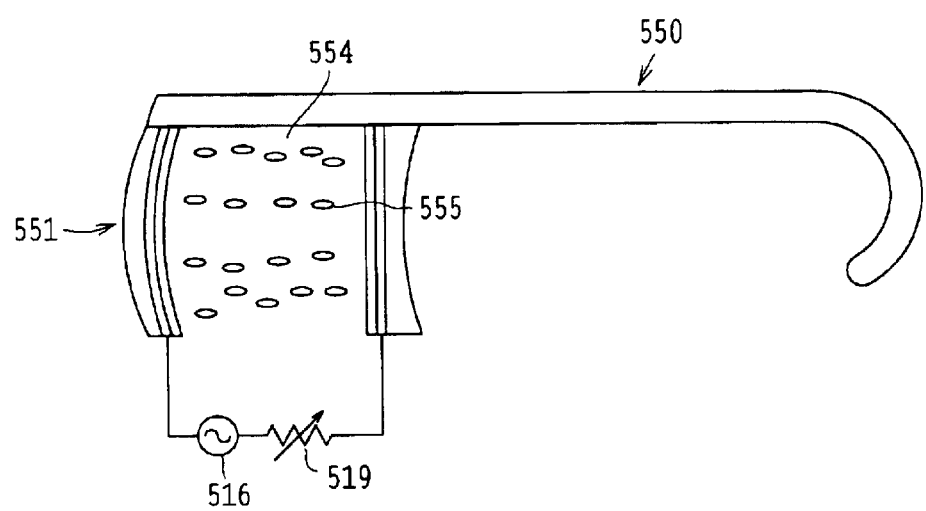
FIG. 36 is a view showing the orientation of liquid crystal molecules where a voltage applied to a twisted nematic liquid crystal layer of FIG. 35 is increased.

A variable focal-length lens using a twisted nematic liquid crystal also falls into the category of the present invention. FIGS. 35 and 36 show variable focal-length spectacles 550 in this case. The variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current electric field is applied to the twisted nematic liquid crystal layer 554.

In this structure, when the voltage applied to the twisted nematic liquid crystal layer 554 is increased, liquid crystal molecules 555, as illustrated in FIG. 36, exhibit a homeotropic orientation, in which the refractive index of the liquid crystal layer 554 is lower and the focal length is longer than in a twisted nematic condition of FIG. 35 in which the applied voltage is low.

A spiral pitch P of the liquid crystal molecules 555 in the twisted nematic condition of FIG. 35 must be made nearly equal to, or much smaller than, the wavelength λ of light, and thus is set to satisfy the following condition:

$$2\ nm \leq P \leq 2\lambda/3 \tag{49}$$

Also, the lower limit of this condition depends on the sizes of the liquid crystal molecules, while the upper limit is necessary for the behavior of the liquid crystal layer 554 as an isotropic medium under the condition of FIG. 35 when incident light is natural light. If the upper limit of the condition is overstepped, the variable focal-length lens 551 is changed to a lens in which the focal length varies with the direction of deflection. Hence, a double image is formed and only a blurred image is obtained.

Figure 37A:
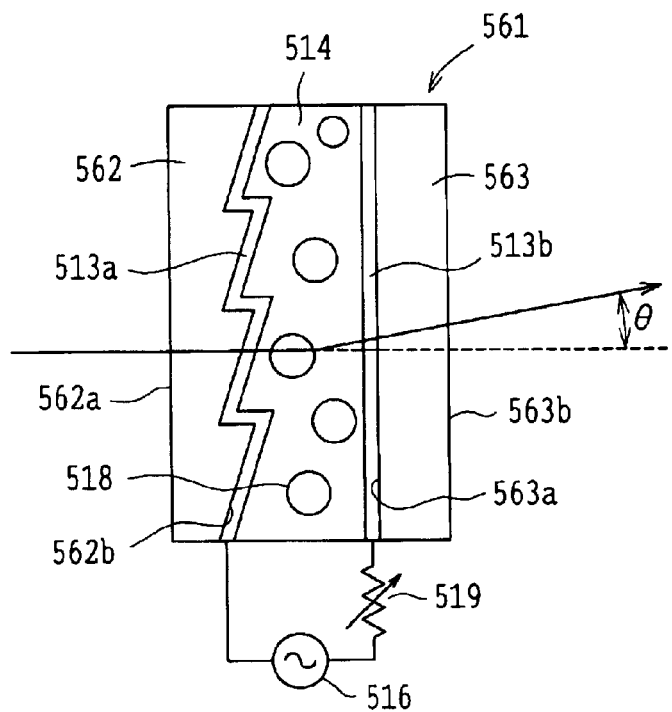
FIGS. 37A and 37B are views showing two examples of variable deflection-angle prisms applicable to the imaging optical system of the present invention.
Figure 37B:
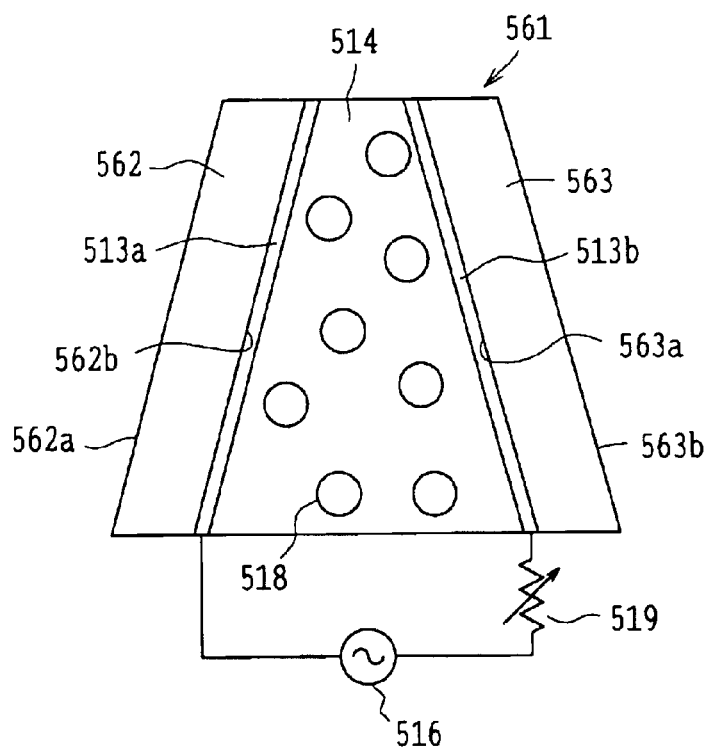

FIG. 37A show a variable deflection-angle prism applicable to the imaging optical system according to the present invention. A variable deflection-angle prism 561 includes a first transparent substrate 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 29, is sandwiched, through the transparent electrodes 513a and 513b, between the transparent substrate 562 and the transparent substrate 563 on the exit side. The transparent electrodes 513a and 513b are connected to the alternating-current power supply 516 through the variable resistor 519. Whereby, the alternating-current electric field is applied to the liquid crystal layer 514 so that the deflection angle of light transmitted through the variable deflection-angle prism 561 is controlled. Also, in FIG. 37A, the inner surface 562b of the transparent substrate 562 is configured into the Fresnel form, but as shown in FIG. 37B, the inner surfaces of the transparent substrates 562 and 563 may be configured like an ordinary prism whose surfaces are relatively inclined, or may be configured like the diffraction grating shown in FIG. 34. In the case of the diffraction grating, Equations (42)–(45) and Conditions (46)–(48) can be used.

Figure 38:
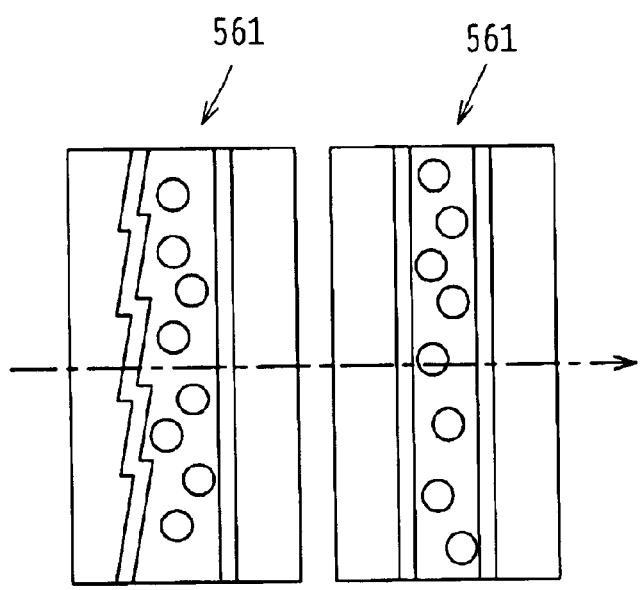
FIG. 38 is a view for explaining the applications of the variable deflection-angle prisms shown in FIGS. 37A and 37B.

The variable deflection-angle prism 561 constructed mentioned above can be effectively used for shake prevention for TV cameras, digital cameras, film cameras, binoculars, etc. In this case, it is desirable that the direction of refraction (deflection) of the variable deflection-angle prism 561 is vertical, but in order to further improve its performance, it is desirable that two variable deflection-angle prisms 561 are arranged so that the directions of deflection are varied and as shown in FIG. 38, the refraction angles are changed in vertical and lateral directions. Also, in FIGS. 37A, 37B, and 38, the liquid crystal molecules are omitted.

Figure 39:
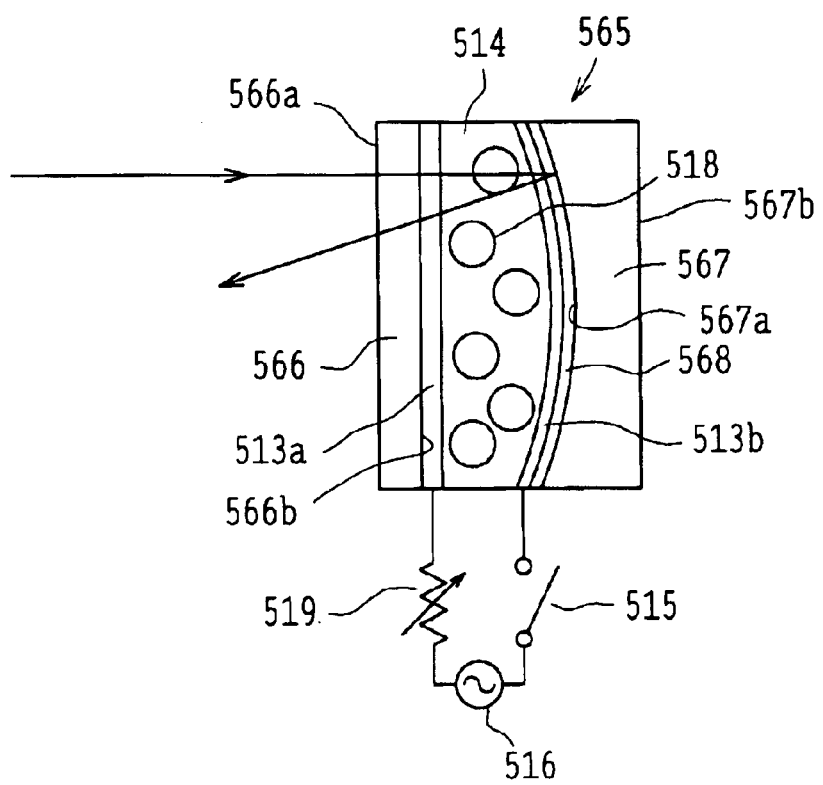
FIG. 39 is a view schematically showing the variable focal-length mirror which applies a variable focal-length lens which can be used in the imaging optical system according to the present invention.

FIG. 39 shows a variable focal-length mirror which applies the variable focal-length lens used in the imaging optical system according to the present invention. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as a concave surface, on which a reflecting film 568 is deposited, and the transparent electrode 513b is provided on the reflecting film 568. Between the transparent electrodes 513a and 513b, as in FIG. 29, the macromolecular dispersed liquid crystal layer 514 is sandwiched so that the transparent electrodes 513a and 513b are connected to the alternating-current power supply 516 through the switch 515 and the variable resistor 519, and the alternating-current electric field is applied to the macromolecular dispersed liquid crystal layer 514. In this figure, the liquid crystal molecules are not shown.

According to the above structure, since a ray of light incident on the transparent substrate 566 is passed again through the liquid crystal layer 514 by the reflecting film 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, Conditions mentioned above can be used. Moreover, the inner surface of the transparent substrate 566 or 567, as shown in FIG. 34, can also be configured into the diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current electric field to the liquid crystal. However, a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 512a and 512b, the transparent substrate 532, the lens 538, one of the lenses 552 and 553, the transparent substrate 563 of FIG. 37A, one of the transparent substrates 562 and 563 of FIG. 37B, or one of the transparent substrates 566 and 567 may be eliminated. In the present invention, the variable focal-length mirror whose shape is not changed, such as that shown in FIG. 39, also falls into the category of the deformable mirror.

Figure 40:
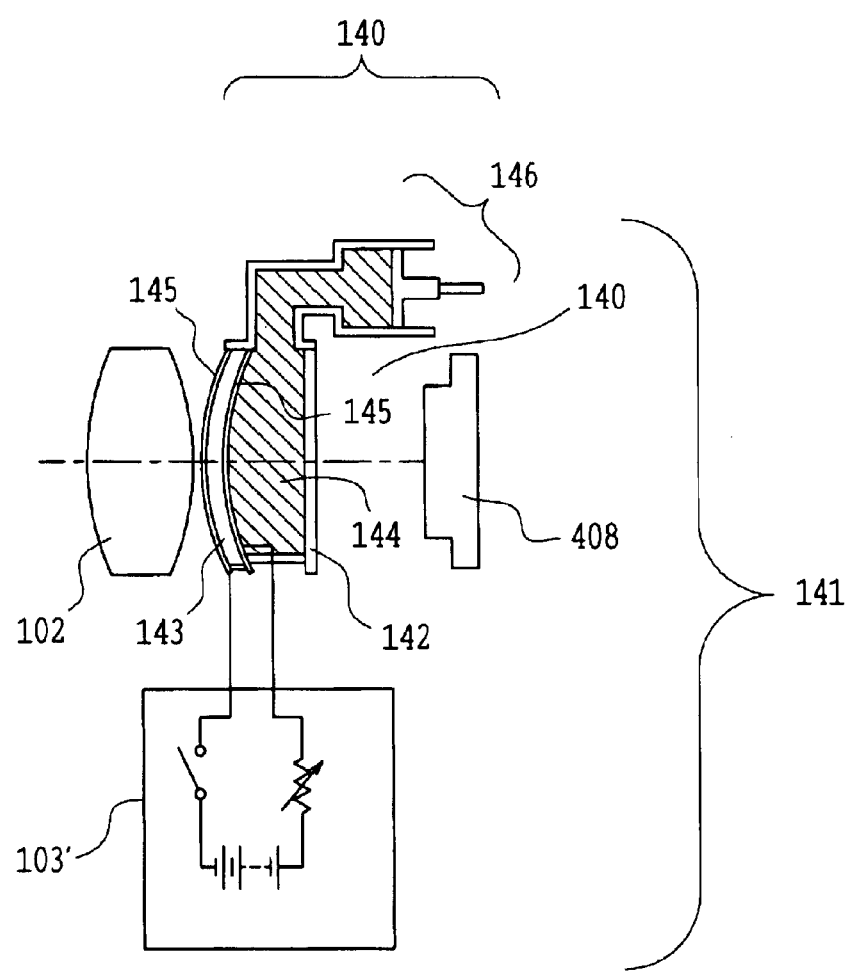
FIG. 40 is a view schematically showing an imaging unit using another embodiment of the variable focal-length lens which can be used in the imaging optical system of the present invention.

FIG. 40 shows an imaging unit 141 using a variable focal-length lens 140 in another embodiment of the variable focal-length lens used in the imaging optical system of the present invention. The imaging unit 141 can be used as the imaging system of the present invention.

In this embodiment, the lens 102 and the variable focal-length lens 140 constitute an imaging lens system, and the imaging lens system and the solid-state image sensor 408 constitute the imaging unit 141. The variable focal-length lens 140 is constructed with a light-transmitting fluid or jelly-like substance 144 sandwiched between a transparent member 142 and a soft transparent substance 143 such as piezoelectric synthetic resin.

As the fluid or jelly-like substance 144, silicon oil, elastic rubber, jelly, or water can be used. Transparent electrodes 145 are provided on both surfaces of the transparent substance 143, and when the voltage is applied through a circuit 103', the transparent substance 143 is deformed by the piezoelectric effect of the transparent substance 143 so that the focal length of the variable focal-length lens 140 is changed.

Thus, according to the embodiment, even when the object distance is changed, focusing can be performed without moving the optical system with a motor, and as such the embodiment excels in compact and lightweight design and low power consumption.

In FIG. 40, reference numeral 146 denotes a cylinder for storing a fluid. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the surface of the deformable mirror, which is favorable.

It is good practice to use a transparent piezoelectric substance for the variable focal-length lens.

Figure 41:
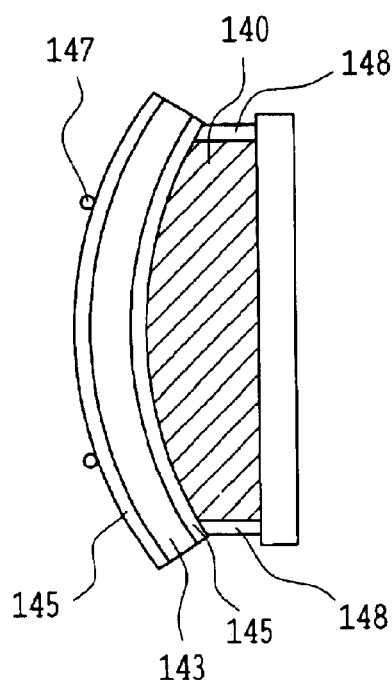
FIG. 41 is a view schematically showing a modified example of the variable focal-length lens of FIG. 40.

In FIG. 40, instead of using the cylinder 146, the variable focal-length lens 140, as shown in FIG. 41, may be designed to use supporting members 147.

Figure 42:
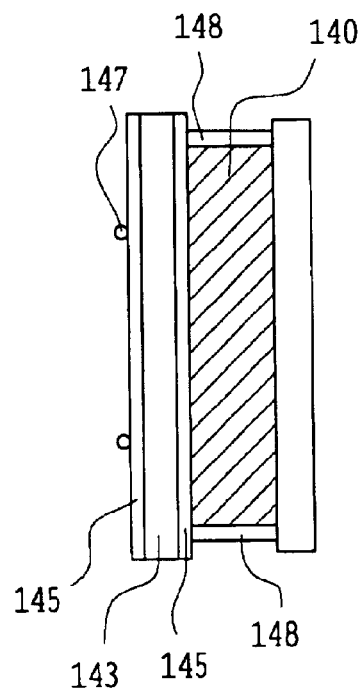
FIG. 42 is an explanatory view showing a state where the variable focal-length lens of FIG. 41 is deformed.

The supporting members 147 are designed to fix the periphery of a part of the transparent substance 143 sandwiched between the transparent electrodes 145. According to the embodiment, even when the voltage is applied to the transparent substance 143 and thereby the transparent substance 143 is deformed, as shown in FIG. 42, the volume of the entire variable focal-length lens 140 remains unchanged. As such, the cylinder 146 becomes unnecessary. Also, in FIGS. 41 and 42, reference numeral 148 designates a deformable member, which is made with an elastic body, accordion-shaped synthetic resin, or metal.

In each of the examples shown in FIGS. 40 and 41, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 43:
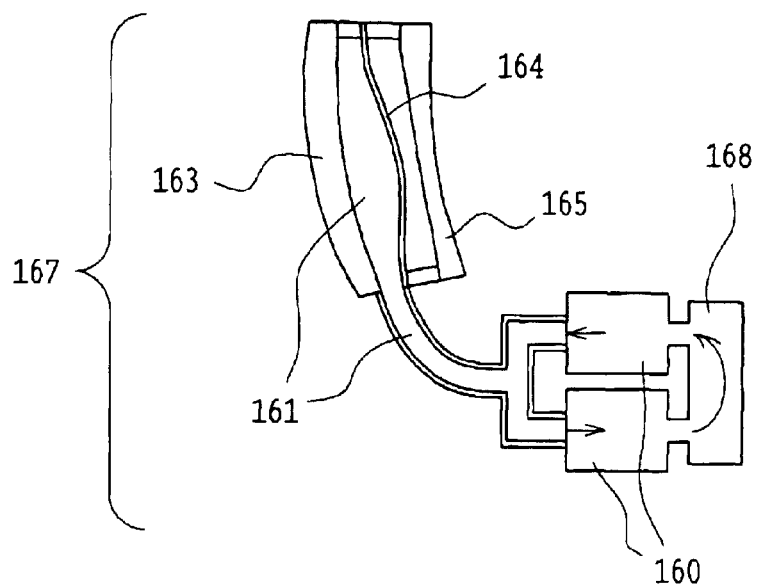
FIG. 43 is a view schematically showing another embodiment of the variable focal-length lens which can be used in the imaging optical system of the present invention.

FIG. 43 shows a variable focal-length lens 167 in which the fluid 161 is taken in and out by a micropump 160 to deform the lens surface, in another embodiment of the variable focal-length lens used in the imaging optical system of the present invention.

The micropump 160 is a small-sized pump, for example, made by a micro-machining technique and is constructed so that it is operated with an electric power. The fluid 161 is sandwiched between a transparent substrate 163 and an elastic body 164. In FIG. 43, reference numeral 165 represents a transparent substrate for protecting the elastic body 164 and this substrate is not necessarily required.

As examples of pumps made by the micromachining technique, there are those which use thermal deformations, piezoelectric substances, and electrostatic forces.

It is only necessary to use the micropump 180 shown in FIG. 28 as two micropumps, for example, as in the micropump 160 used in the variable focal-length lens of FIG. 43.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 44:
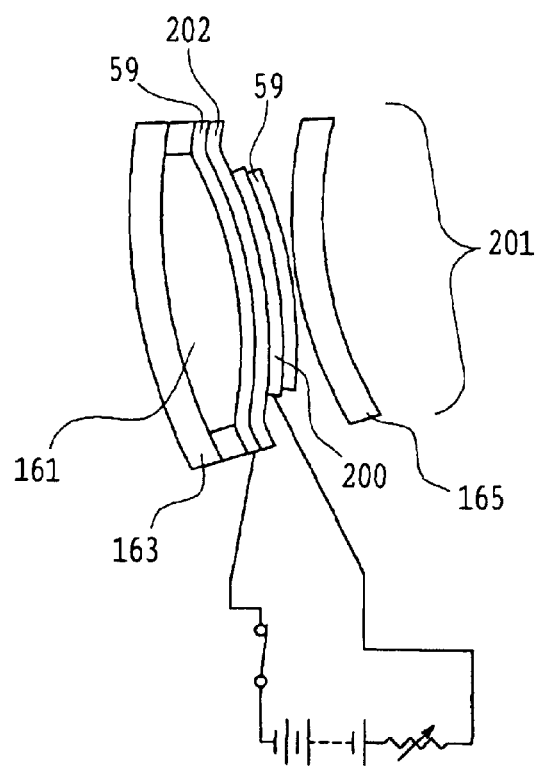
FIG. 44 is a view schematically showing another embodiment of the variable optical-property element applicable to the imaging optical system of the present invention.

FIG. 44 shows a variable focal-length lens 201 using a piezoelectric substance 200 in another embodiment of a variable optical-property element applicable to the imaging optical system according to the present invention. The same substance as the transparent substance 143 is used for the piezoelectric substance 200, which is provided on a soft transparent substrate 202. It is desirable that synthetic resin or an organic substance is used for the substrate 202.

In this embodiment, the voltage is applied to the piezoelectric substance 200 through the two transparent electrodes 59, and thereby the piezoelectric substance 200 is deformed so that the function of a convex lens is exercised in FIG. 44.

Figure 45:
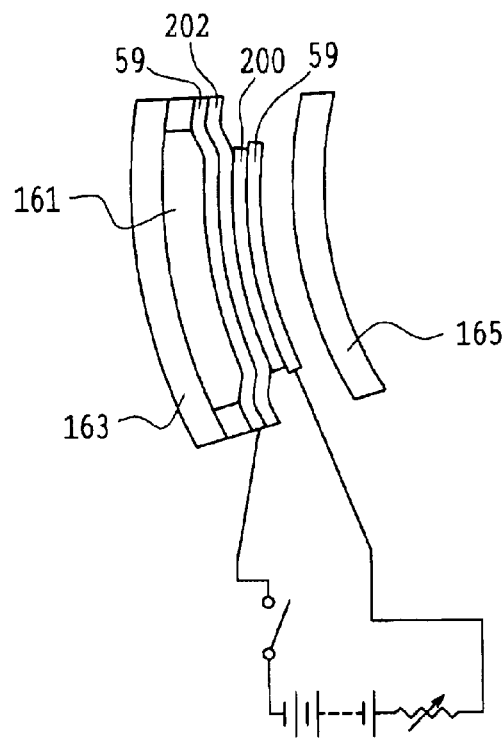
FIG. 45 is an explanatory view showing a state where the variable focal-length lens of FIG. 44 is deformed.

The substrate 202 is previously configured into a convex form, and at least one of the two transparent electrodes 59 is caused to differ in size from the substrate 202, for example, one of the electrodes 59 is made smaller than the substrate 202. In doing so, when the applied voltage is removed, the opposite, preset portions of the two transparent electrodes 59, as shown in FIG. 45, are deformed into concave shapes so as to have the function of a concave lens, acting as the variable focal-length lens. In this case, since the substrate 202 is deformed so that the volume of the fluid 161 is not changed, there is the merit that the liquid tank 168 becomes unnecessary.

This embodiment has a great merit that a part of the substrate holding the fluid 161 is deformed by the piezoelectric substance and the liquid tank 168 is dispensed with.

The transparent substrates 163 and 165 may be constructed with lenses or plane surfaces, and the same may be said of the embodiment of FIG. 43.

Figure 46:
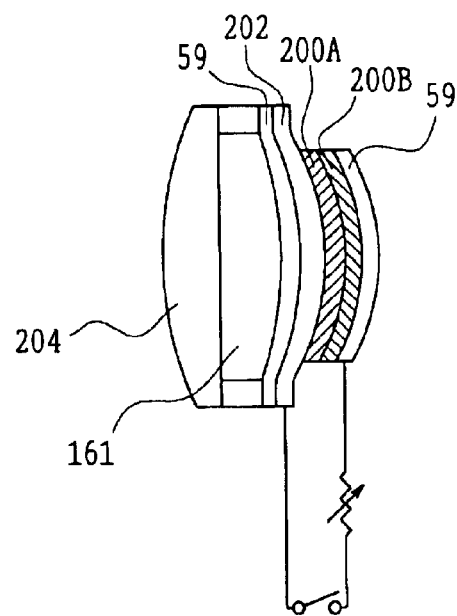
FIG. 46 is a view schematically showing still another embodiment of the variable optical-property element applicable to the imaging optical system according to the present invention.

FIG. 46 shows a variable focal-length lens using two thin plates 200A and 200B constructed of piezoelectric substances in still another embodiment of the variable optical-property element applicable to the imaging optical system according to the present invention.

The variable focal-length lens of this embodiment has the merit that the thin plate 200A is reversed in direction of the substance with respect to the thin plate 200B, and thereby the amount of deformation is increased so that a wide variable focal-length range can be obtained. Also, in FIG. 46, reference numeral 204 denotes a lens-shaped transparent substrate. Even in the embodiment, the transparent electrode 59 is configured to be smaller than the substrate 202.

In the embodiments of FIGS. 44–46, the thicknesses of the substrate 202, the piezoelectric substance 200, and the thin plates 200A and 200B may be rendered uneven so that a state of deformation caused by the application of the voltage is controlled. By doing so, lens aberration can be corrected, which is convenient.

Figure 47:
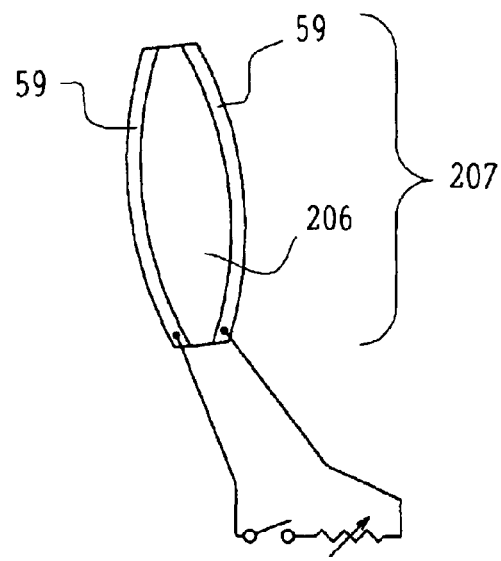
FIG. 47 is a view schematically showing still another embodiment of the variable focal-length lens used in the imaging optical system according to the present invention.
Figure 48:
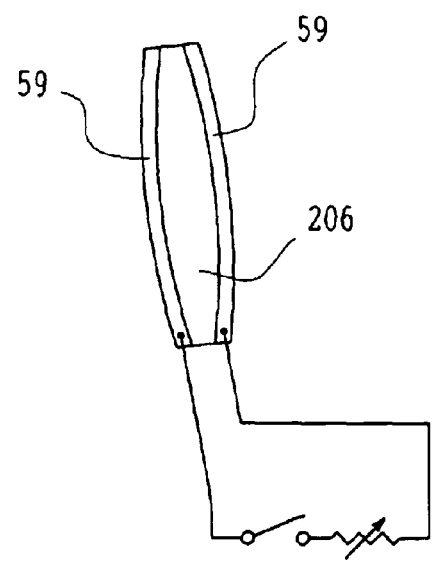
FIG. 48 is an explanatory view showing the deformation of the variable focal-length lens of FIG. 47.

FIG. 47 shows another embodiment of the variable focal-length lens used in the imaging optical system according to the present invention. A variable focal-length lens 207 of this embodiment uses an electrostrictive substance 206 such as silicon rubber or acrylic elastomer. According to the embodiment, when the voltage is low, the electrostrictive substance 206, as depicted in FIG. 47, acts as a convex lens, while when the voltage is increased, the electrostrictive substance 206, as depicted in FIG. 48, expands in a vertical direction and contracts in a lateral direction, and thus the focal length is increased. In this way, the electrostrictive substance 206 operates as the variable focal-length lens.

According to the variable focal-length lens of the embodiment, there is the merit that since a large power supply is not required, power consumption is minimized.

Figure 49:
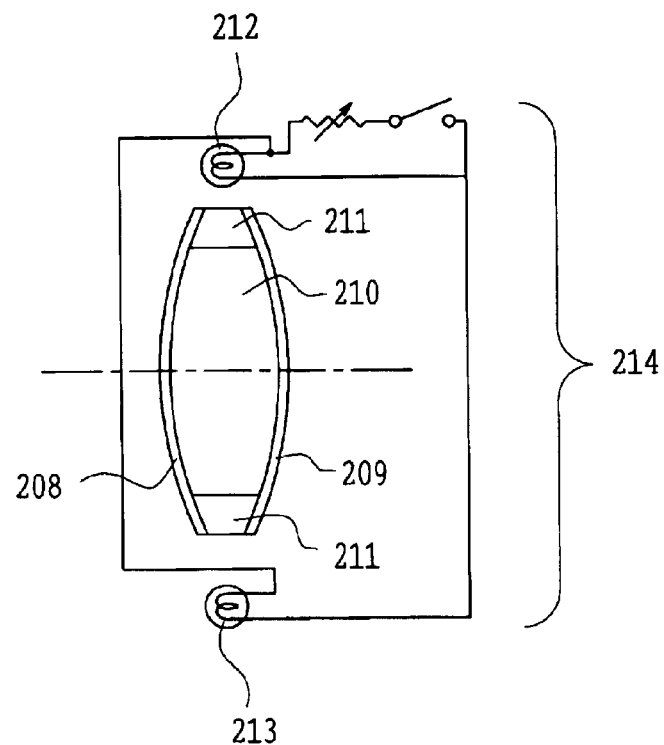
FIG. 49 is a view schematically showing a further embodiment of the variable optical-property element applicable to the imaging optical system of the present invention.

FIG. 49 shows a variable focal-length lens using a photomechanical effect in a further embodiment of the variable optical-property element applicable to the imaging optical system according to the present invention.

A variable focal-length lens 214 of this embodiment is designed so that azobenzene 210 is sandwiched between transparent elastic bodies 208 and 209 and is irradiated with light through a transparent spacer 211. In FIG. 49, reference numerals 212 and 213 represent light sources, such as LEDs or semiconductor lasers, of central wavelengths $\lambda_1$ and $\lambda_2$, respectively.

Figures 50A, 50B:
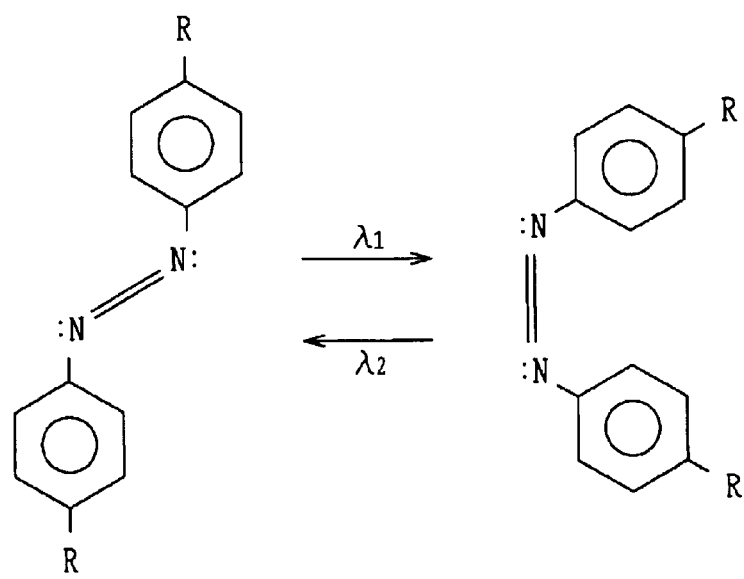
FIG. 50A is an explanatory view showing the structure of trans-type azobenzene used in the variable focal-length lens in FIG. 49.
FIG. 50B is an explanatory view showing the structure of cis-type azobenzene used in the variable focal-length lens in FIG. 49.

In the embodiment, when trans-type azobenzene shown in FIG. 50A is irradiated with light of the central wavelength $\lambda_1$, the azobenzene 210 changes to cis-type azobenzene shown in FIG. 50B to reduce its volume. Consequently, the thickness of the variable focal-length lens 214 is decreased, and the function of the convex lens is impaired.

On the other hand, when the cis-type azobenzene 210 is irradiated with light of the central wavelength $\lambda_2$, the azobenzene 210 changes from to the cis-type azobenzene to the trans-type azobenzene to increase the volume. Consequently, the thickness of the variable focal-length lens 214 is increased, and the function of the convex lens is improved.

In this way, the optical element of the embodiment acts as the variable focal-length lens.

In the variable focal-length lens 214, since the ultraviolet light is totally reflected at the interface between each of the transparent elastic bodies 208 and 209 and air, the light does not leak through the exterior and high efficiency is obtained. The wave-length of light used in the lens is not limited to that of visible light and may be that of infrared light. Also, as the azobenzene 210, a mixture of the azobenzene and other liquid may be used.

Figure 51:
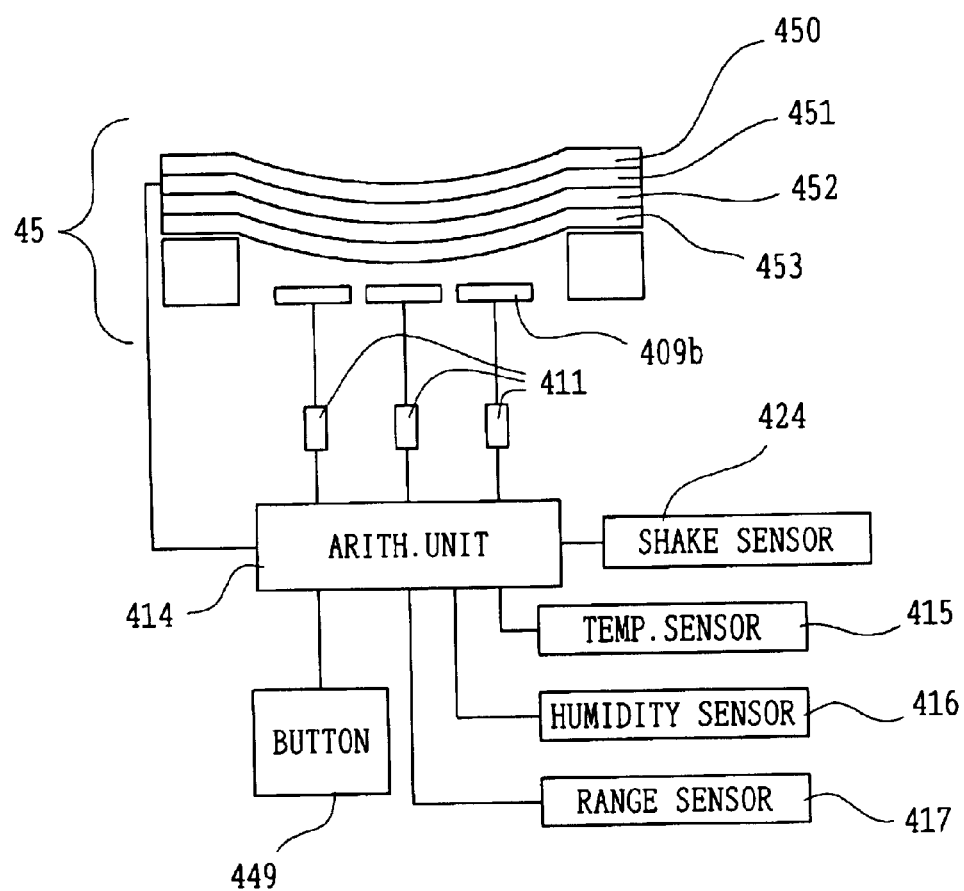
FIG. 51 is a view schematically showing another embodiment of the variable optical-property mirror which can be used in the imaging optical system of the present invention.

FIG. 51 shows another embodiment of the deformable mirror used in the imaging optical system according to the present invention. In this embodiment, the deformable mirror is used in the digital camera. Again, in FIG. 51, reference numeral 411 denotes the variable resistors; 414 denotes the arithmetical unit; and 415, 416, 417, and 424 denote the temperature sensor, the humidity sensor, the range sensor, and the shake sensor, respectively, The deformable mirror 45 of the embodiment is such that the divided electrodes 409b are spaced away from the electrostrictive substance 453 including an organic substance such as acrylic elastomer, on which an electrode 452 and the deformable substrate 451 are placed in turn, and a reflecting film 450 including metal, such as aluminum, for reflecting incident light is provided on the substrate 451.

The deformable mirror, when constructed as mentioned above, has the merit that the surface of the reflecting film 450 becomes smooth and it is hard to produce aberration, in contrast to the case where the divided electrodes 409b and the electrostrictive substance 453 are integrally constructed. Also, the deformable substrate 451 and the electrode 452 may be arranged in reverse order.

In FIG. 51, reference numeral 449 stands for a button for changing the magnification of the optical system or zooming. The deformable mirror 45 is controlled through the arithmetical unit 414 so that a user pushes the button 449 and thereby the reflecting film 450 can be deformed to change the magnification or zoom.

In this case, instead of the electrostrictive substance including an organic substance such as acrylic elastomer, the piezoelectric substance such as barium titanate may be used.

Finally, the terms used in the present invention will be described.

An optical apparatus used in the present invention refers to an apparatus including an optical system or optical elements. The optical apparatus need not necessarily function by itself. That is, it may be thought of as a part of an apparatus.

The optical apparatus includes an imaging device, an observation device, a display device, an illumination device, and a signal processing device.

The imaging device refers to, for example, a film camera, a digital camera, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

The extended surface is defined as follows:

Each of the surfaces of lenses, prisms, and mirrors need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In the present invention, it is assumed that such a surface is generally referred as to the extended surface.

The variable optical-property element includes a variable focal-length lens, a deformable mirror, a deflection prism in which a surface profile is changed, a variable angle prism, a variable diffraction optical element in which the function of light deflection is changed, namely a variable HOE, or a variable DOE.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property element.

An information transmitter refers to a device which is capable of inputting and transmitting any information from a cellular phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

According to the present invention, as will be obvious from the above description, the imaging optical system which allows focusing to be performed, irrespective of its small diameter and size, can be provided.

What is claimed is:

1. An imaging optical system including at least one deformable mirror, wherein the imaging optical system satisfies the following condition:

$$50°<2\omega<175°$$

where $\omega$ is a horizontal half angle of view.

2. An imaging optical system including at least one deformable mirror, wherein the deformable mirror is placed on an object side of an imaging plane, and an optical element with power is absent between the imaging plane and the deformable mirror.

3. An imaging optical system including at least one deformable mirror, wherein only one optical element is present on an object side of the deformable mirror.

4. An imaging optical system including at least two deformable mirrors, wherein an optical element with power is absent between the two deformable mirrors.

5. An imaging optical system including at least one deformable mirror, the imaging optical system comprising:

a cemented lens; and a stop, wherein the imaging optical system has a single focal length, and the cemented lens is interposed between the stop and the deformable mirror.

6. An imaging optical system comprising:

at least one deformable mirror; and a rotationally symmetrical optical surface, wherein focusing of the imaging optical system is performed through a deformation of said the at least one deformable mirror, and wherein the imaging optical system is configured so that an angle made by an object plane with an imaging plane of the imaging optical system ranges between 5° and 48°, the object plane being set perpendicular to an optical axis at a most object-side position of the imaging optical system.

7. An imaging optical system comprising:

at least one deformable mirror; and a rotationally symmetrical optical surface, wherein the imaging optical system is configured so that an angle made by an object plane with an imaging plane of the imaging optical system ranges between 5° and 48°, the object plane being set perpendicular to an optical axis at a most object-side position of the imagine optical system.

8. An imaging optical system including a plurality of deformable mirrors to perform focusing through deformations of the deformable mirrors.

9. An imaging optical system according to claim 2, wherein the imaging optical system has a single focal length.

10. An imaging optical system according to claim 3, wherein the imaging optical system has a single focal length and only one optical element is present on the object side of the deformable mirror, the optical element including a rotationally symmetrical optical surface.

11. An imaging optical system according to any one of claims 1–5 and 7, wherein focusing is performed by a deformation of the deformable mirror.

12. An imaging optical system according to any one of claims 1–6 and 8, wherein the imaging optical system has an optical element including an axisymmetrical optical surface and the deformable mirror.

13. An imaging optical system according to any one of claims 1–8, wherein an axial ray of light incident from an object on the imaging optical system and an axial ray of light incident on an imaging plane of the imaging optical system are substantially parallel (within a limit of ±5°) or substantially perpendicular (within a limit of ±5°).

14. An imaging optical system according to any one of claims 1–8, satisfying the following condition:

$$0 < md/f\_tot < 1$$

where md is a maximum amount of deformation of a mirror surface of one deformable mirror and f_tot is a focal length of an entire optical system.

15. An imaging optical system according to any one of claims 1–8, wherein a driving system of one deformable mirror is one of an electrostatic driving system, an electromagnetic driving system, a piezoelectric effect system, or a fluid driving system.

16. An imaging optical system according to any one of claims 1–8, satisfying the following condition:

$$0.01 < Sk/f\_tot < 100$$

where Sk is a distance from a most imaging-plane-side optical surface with power to an imaging plane and f_tot is a focal length of an entire optical system.

* * * * *

UNITED STATES PATENT AND TRADEMARK OFFICE
CERTIFICATE OF CORRECTION

PATENT NO. : 6,801,370 B2
DATED : October 5, 2004
INVENTOR(S) : Kentaro Sekiyama et al.

It is certified that error appears in the above-identified patent and that said Letters Patent is hereby corrected as shown below:

Column 39,
Line 5, please delete "said".

Signed and Sealed this

Second Day of August, 2005

JON W. DUDAS
*Director of the United States Patent and Trademark Office*